United States Patent
Kazuta

(10) Patent No.: US 8,366,501 B2
(45) Date of Patent: Feb. 5, 2013

(54) OUTBOARD MOTOR

(75) Inventor: Hisashi Kazuta, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 176 days.

(21) Appl. No.: 13/008,043

(22) Filed: Jan. 18, 2011

(65) Prior Publication Data

US 2011/0223819 A1 Sep. 15, 2011

(30) Foreign Application Priority Data

Mar. 12, 2010 (JP) ................................. 2010-055524

(51) Int. Cl.
 *F01N 3/04* (2006.01)
 *B63H 21/00* (2006.01)
(52) U.S. Cl. .................................... 440/89 H; 440/89 R
(58) Field of Classification Search ................ 440/89 B, 440/89 H, 89 R; 123/195 P
 See application file for complete search history.

(56) References Cited

U.S. PATENT DOCUMENTS

| 5,494,467 A |   | 2/1996 | Sohgawa et al. |
| 5,562,510 A | * | 10/1996 | Suzuki et al. ............... 440/89 R |
| 6,053,785 A |   | 4/2000 | Kato et al. |

FOREIGN PATENT DOCUMENTS

| JP | 2007-154796 A | 6/2007 |
| JP | 3942234 B2 | 7/2007 |

* cited by examiner

Primary Examiner — Lars A Olson
(74) Attorney, Agent, or Firm — Keating & Bennett, LLP

(57) ABSTRACT

An outboard motor includes an engine, a housing, a catalyst, and an engine cover. The housing includes a partitioning wall that is arranged to partition an interior of the housing into a first exhaust space connected to exhaust ports of the engine, and a second exhaust space connected to the first exhaust space. The housing is arranged such that the second exhaust space is positioned at the same side as the first exhaust space with respect to a plane that includes central axes of the plurality of the cylinders. The catalyst is positioned at a height such that at least a portion of the catalyst overlaps with the first exhaust space when viewed from a horizontal direction. The catalyst is disposed in the second exhaust space so as to guide the exhaust guided from the first exhaust space to the second exhaust space.

12 Claims, 17 Drawing Sheets

1

OUTBOARD MOTOR

BACKGROUND OF THE INVENTION

1. Field of the Invention

The present invention relates to an outboard motor.

2. Description of the Related Art

A conventional outboard motor is described, for example, in U.S. Pat. No. 5,494,467. The outboard motor includes an engine including a plurality of cylinders, an exhaust manifold connected to the engine, an exhaust passage in communication with the exhaust manifold, and a catalyst disposed in the exhaust passage. The catalyst is, for example, a ternary catalyst. The catalyst is disposed at an opposite side from the exhaust manifold with respect to the plurality of cylinders.

SUMMARY OF THE INVENTION

The inventor of preferred embodiments of the present invention described and claimed in the present application conducted an extensive study and research regarding an outboard motor, such as the one described above, and in doing so, discovered and first recognized new unique challenges and previously unrecognized possibilities for improvements as described in greater detail below.

Specifically, a cleaning ability of a ternary catalyst is exhibited adequately when the catalyst itself is at a high temperature. However, with the conventional outboard motor, the exhaust manifold and the catalyst are disposed at mutually opposite sides with respect to the plurality of cylinders. A distance from an exhaust port provided in the engine and the catalyst is thus long and exhaust that is lowered in temperature passes through the catalyst. The temperature of the catalyst may thus not increase adequately and a high cleaning efficiency may not be obtained.

In order to overcome the previously unrecognized and unsolved challenges described above, a preferred embodiment of the present invention provides an outboard motor that includes an engine, a housing, a catalyst, and an engine cover. The engine includes a plurality of cylinders that are aligned vertically, and a plurality of exhaust ports to which exhaust is guided from the plurality of the cylinders. The exhaust discharged from the exhaust ports is guided into an interior of the housing. The housing includes a partitioning wall arranged to partition the interior of the housing into a first exhaust space connected to the plurality of exhaust ports, and a second exhaust space connected to the first exhaust space. The housing is arranged such that the first exhaust space collects and guides the exhaust guided from the plurality of exhaust ports and that the second exhaust space is positioned at the same side as the first exhaust space with respect to a plane that includes central axes of the plurality of the cylinders. The catalyst is housed in the housing. The catalyst is positioned at a height such that at least a portion of the catalyst overlaps with the first exhaust space when viewed from a horizontal direction. The catalyst is disposed in the second exhaust space so as to guide the exhaust guided from the first exhaust space to the second exhaust space. The engine cover houses the engine and the housing.

With the arrangement of the present preferred embodiment, the engine and the housing are housed inside the engine cover. The catalyst is housed inside the housing. The interior of the housing is partitioned into the first exhaust space and the second exhaust space by the partitioning wall. The first exhaust space and the second exhaust space are positioned at the same side with respect to the plane that includes central axes of the plurality of the cylinders. The catalyst is disposed in the second exhaust space at a height such that at least a portion of the catalyst overlaps with the first exhaust space when viewed from the horizontal direction. That is, at least a portion of the catalyst is adjacent to the first exhaust space in the horizontal direction. The first exhaust space is warmed by the high-temperature exhaust discharged from the exhaust ports. The catalyst is thus warmed adequately by heat transmitted from the first exhaust space. Thus, when the catalyst exhibits a high cleaning ability at a high temperature as in a case of a ternary catalyst, etc., an exhaust cleaning efficiency is improved.

The housing may include a first outer wall and a second outer wall. The first outer wall may define the first exhaust space. The first outer wall may include the partitioning wall. At least a portion of the first outer wall may be joined to the second outer wall. The first outer wall may be made of a material that is higher in melting point than the second outer wall.

Also, the housing may include a cooling portion disposed at least at a periphery of the second exhaust space. The cooling portion may be provided with a water jacket.

Also, the partitioning wall may be non-contacting with respect to the cooling portion.

Also, the housing may be arranged such that cooling water is not supplied to the partitioning wall.

Also, the plurality of cylinders may include a plurality of first cylinders that are aligned vertically and a plurality of second cylinders that are aligned vertically. The plurality of first cylinders and the plurality of second cylinders may be arranged in a V-shaped configuration. The housing may be disposed at an inner side of V-shaped lines defined by central axes of the plurality of the first cylinders and central axes of the plurality of the second cylinders.

Also, the first exhaust space may include an upwardly directed exhaust exit. The outboard motor may further include a backflow preventing member. The backflow preventing member may include a flat plate portion and a tubular portion. The flat plate portion may be provided with a passage hole in communication with the exhaust exit. The tubular portion may be disposed along an edge portion of the passage hole and protrude from the flat plate portion to an opposite side from the exhaust exit.

Another preferred embodiment of the present invention provides an outboard motor that includes an engine, a first manifold, a second manifold, a first exhaust pipe, a second exhaust pipe, a first communicating pipe, and a second communicating pipe. The engine includes a plurality of first cylinders that are aligned vertically, a plurality of second cylinders that are aligned vertically, and a plurality of exhaust ports to which exhaust from the plurality of the first cylinders and the plurality of second cylinders is guided. The plurality of first cylinders and the plurality of second cylinders are preferably arranged in a V-shaped configuration. The first and second manifolds are disposed at an inner side of V-shaped lines defined by central axes of the plurality of the first cylinders and central axes of the plurality of the second cylinders. The first manifold is arranged to collect and guide the exhaust guided from the plurality of first cylinders via the exhaust ports. The second manifold is arranged to collect and guide the exhaust guided from the plurality of second cylinders via the exhaust ports. The first exhaust pipe is arranged to guide the exhaust guided from the first manifold. The second exhaust pipe is arranged to guide the exhaust guided from the second manifold. A first catalyst is disposed in the first exhaust pipe. A second catalyst is disposed in the second exhaust pipe. The first communicating pipe is arranged to connect a lower end of the first manifold with a portion of the first exhaust pipe positioned downstream the first catalyst. The second communicating pipe is arranged to connect a lower end of the second manifold with a portion of the second exhaust pipe positioned downstream the second catalyst.

With the arrangement of the present preferred embodiment, the first and second catalysts are disposed in the first and second exhaust pipes, respectively. The exhaust guided from the first manifold to the first exhaust pipe is cleaned by the first catalyst, and the exhaust guided from the second manifold to the second exhaust pipe is cleaned by the second catalyst. The first and second exhaust pipes are disposed at the inner side of the V-shaped lines defined by the central axes of the plurality of the first cylinders and the central axes of the plurality of second cylinders. The first and second exhaust pipes are thus close to the exhaust ports of the engine and exhaust of high temperature is guided into the first and second exhaust pipes. The first and second catalysts can thus be activated at an early stage.

Further, the communicating pipes (first and second communicating pipes) that connect the lower ends of the manifolds and the exhaust pipes are provided, and thus even when condensed water accumulates or otherwise is present inside a manifold, the condensed water is discharged from the manifold into the corresponding exhaust pipe through the communicating pipe. Entry of the condensed water from the manifold into the cylinders through the exhaust ports can thus be prevented. Engine misfire can thereby be prevented. Also, the communicating pipe is connected to the portion of the exhaust pipe positioned downstream the catalyst, and thus the condensed water is discharged to the downstream side of the catalyst through the communicating pipe. Attachment of the condensed water to the catalyst can thus be prevented.

The first manifold may be arranged such that the exhaust gas, guided from the plurality of first cylinders, is collected and guided from below to above. The second manifold may be arranged such that the exhaust gas, guided from the plurality of second cylinders, is collected and guided from below to above. The first exhaust pipe may be arranged such that the exhaust gas, guided from the first manifold, is guided from above to below. The second exhaust pipe may be arranged so that the exhaust gas, guided from the second manifold, is guided from above to below.

By this arrangement, the condensed water that is collected or otherwise is present at the first manifold flows toward the lower end of the first manifold and is discharged to the first exhaust pipe through the first communicating pipe. Entry of the condensed water from the first manifold into the first cylinders through the exhaust ports can thereby be prevented reliably. Likewise, the condensed water that is collected or otherwise is present at the second manifold flows toward the lower end of the second manifold and is discharged to the second exhaust pipe through the second communicating pipe. Entry of the condensed water from the second manifold into the second cylinders through the exhaust ports can thereby be prevented reliably.

The above and other elements, features, steps, characteristics and advantages of the present invention will become more apparent from the following detailed description of the preferred embodiments with reference to the attached drawings.

DETAILED DESCRIPTION OF PREFERRED EMBODIMENTS

Figure 1:
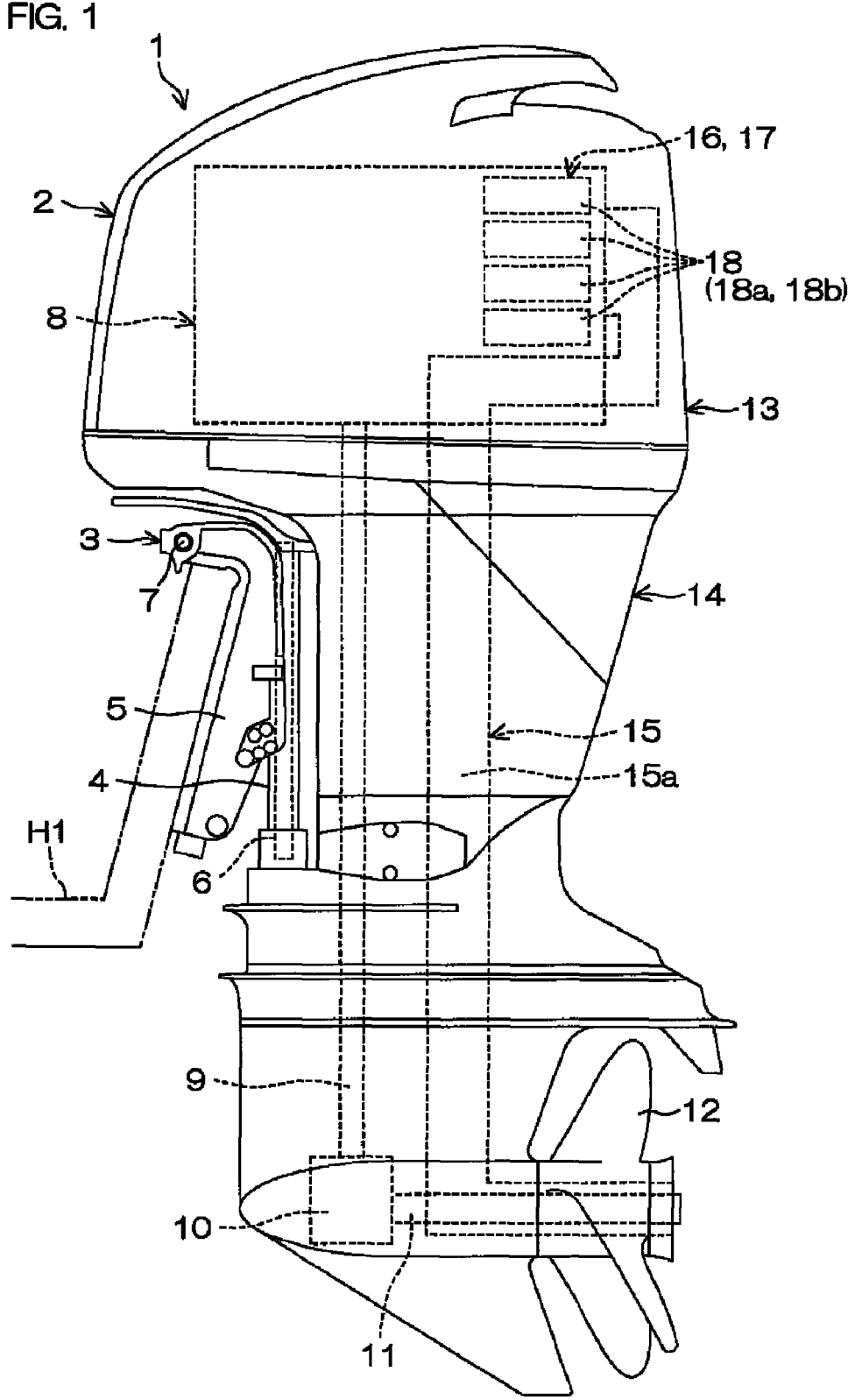
FIG. 1 is a left side view of an outboard motor according to a first preferred embodiment of the present invention.

FIG. 1 is a left side view of an outboard motor 1 according to a first preferred embodiment of the present invention.

The outboard motor 1 includes an outboard motor main body 2 and an attachment mechanism 3. The outboard motor main body 2 is attached to a rear portion of a hull H1 by the attachment mechanism 3. The attachment mechanism 3 includes a swivel bracket 4, a clamp bracket 5, a steering shaft 6, and a tilt shaft 7. The steering shaft 6 is disposed along a vertical direction. The tilt shaft 7 is disposed horizontally along a right/left direction. The swivel bracket 4 is coupled to the outboard motor main body 2 via the steering shaft 6. The clamp bracket 5 is coupled to the swivel bracket 4 via the tilt shaft 7. The clamp bracket 5 is fixed to the rear portion of the hull H1. The outboard motor main body 2 and the swivel bracket 4 are pivotable vertically about the tilt shaft 7 with respect to the clamp bracket 5. Also, the outboard motor main body 2 is pivotable to the right and left about the steering shaft 6 with respect to the swivel bracket 4 and the clamp bracket 5.

The outboard motor main body 2 includes an engine 8, a driveshaft 9, a forward-reverse switching mechanism 10, a propeller shaft 11, and a propeller 12. The outboard motor main body 2 also includes an engine cover 13 and a casing 14. The engine 8 is an internal combustion engine that generates power by combustion of a fuel, such as gasoline. The engine 8 is housed inside the engine cover 13. A large portion of the engine cover 13 is preferably made, for example, of a material that includes a synthetic resin. The casing 14 is disposed below the engine cover 13. The driveshaft 9 is disposed along the vertical direction inside the casing 14. The propeller shaft 11 is disposed along a front/rear direction inside a lower portion of the casing 14. An upper end portion of the driveshaft 9 is coupled to the engine 8. A lower end portion of the driveshaft 9 is coupled to a front end portion of the propeller shaft 11 by the forward-reverse switching mechanism 10. The propeller 12 is coupled to the rear end portion of the propeller shaft 11.

Rotation of the engine 8 is transmitted to the driveshaft 9. Also, rotation of the driveshaft 9 is transmitted to the propeller shaft 11 via the forward-reverse switching mechanism 10. The propeller 12 is rotated together with the propeller shaft 11. A propulsive force that drives the hull H1 forward or in reverse is generated by the rotation of the propeller 12. A rotation direction of the propeller shaft 11 and the propeller 12 is switched by the forward-reverse switching mechanism 10. Switching between forward drive and reverse drive of the hull H1 is performed in accordance with the rotation direction of the propeller 12.

The outboard motor main body 2 includes an exhaust passage 15 provided in an interior of the outboard motor main body 2. An entrance of the exhaust passage 15 is connected to the engine 8. An exit of the exhaust passage 15 is connected to the propeller 12. In a state where the hull H1 is afloat on water, the exit of the exhaust passage 15 is positioned underwater. Thus, in the state where the hull H1 is afloat on water, water in surroundings of the outboard motor 1 enters into a downstream portion of the exhaust passage 15. Exhaust generated in the engine 8 is discharged underwater through the exhaust passage 15 and from the propeller 12 (exit of the exhaust passage 15).

Figure 2:
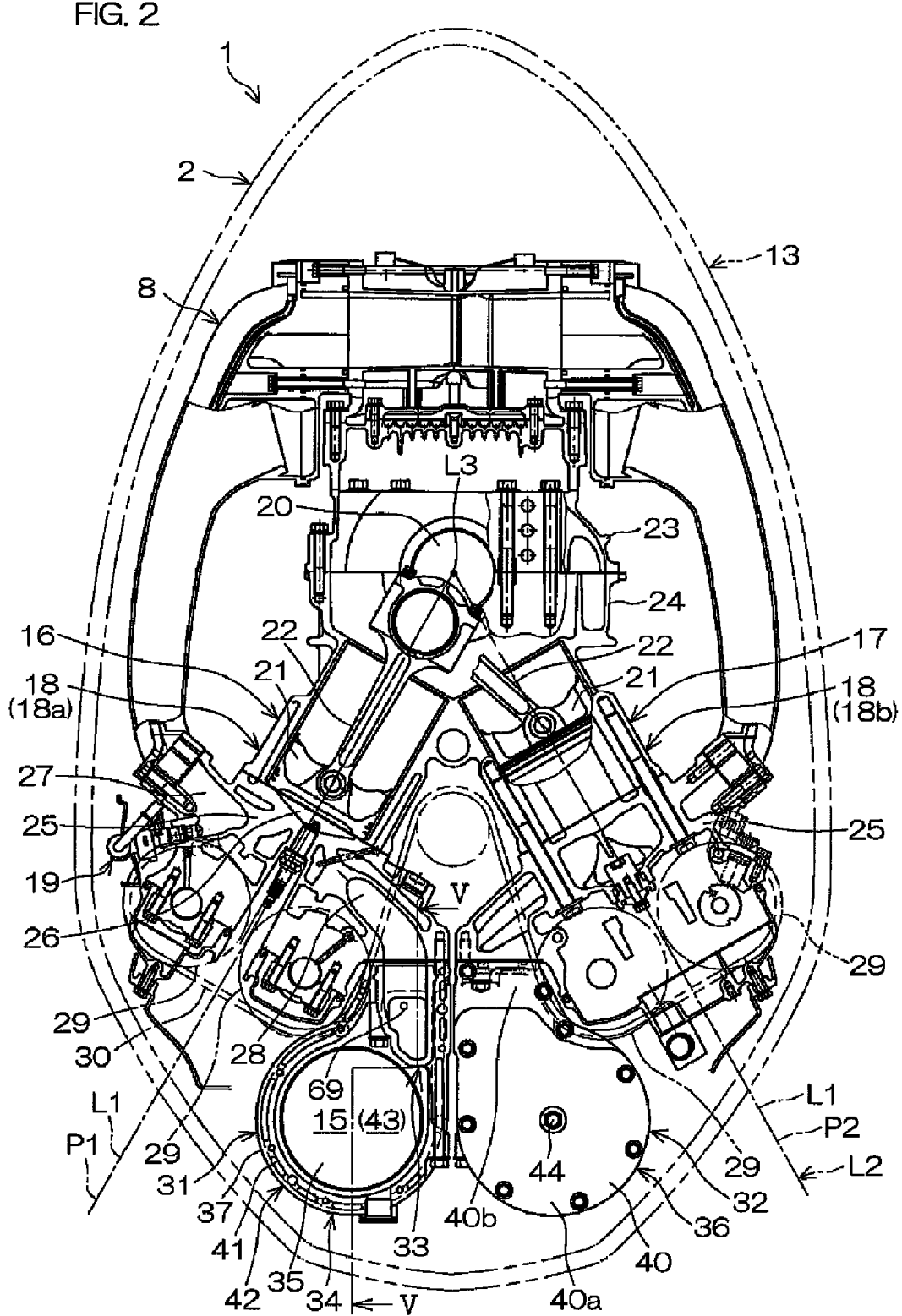
FIG. 2 is a partial sectional view of the outboard motor according to the first preferred embodiment of the present invention.

FIG. 2 is a partial sectional view of the outboard motor 1 according to the first preferred embodiment of the present invention. In FIG. 2, hatching that indicates a section is omitted.

The engine 8 preferably is, for example, a V-type multi-cylinder 4-cycle engine. The engine 8 includes a plurality (for example, eight) of cylinders 18. The engine 8 includes two cylinder columns (a first cylinder column 16 and a second cylinder column 17) that are preferably arranged in a V-shaped configuration in plan view. The first cylinder column 16 and the second cylinder column 17 are disposed in a shape of a V that spreads toward the rear in plan view. Central axes L1 of the plurality of cylinders 18 define right/left symmetrical V-shaped lines L2. A fuel injector 19 and other equipment housed inside the engine cover 13 are attached to the engine 8, for example, at an outer side of the V-shaped lines L2.

Each of the first cylinder column 16 and the second cylinder column 17 includes a plurality (for example, four) of cylinders 18 that are aligned linearly along the vertical direction (see FIG. 1). Each cylinder 18 including in the first cylinder column 16 is a first cylinder 18a. Each cylinder 18 included in the second cylinder column 17 is a second cylinder 18b. The four first cylinders 18a are cylinders that respectively differ in combustion cycle phase. Likewise, the four second cylinders 18b are cylinders that respectively differ in combustion cycle phase.

The engine 8 includes a crankshaft 20, a plurality of pistons 21, and a plurality of connecting rods 22. The engine 8 also includes a crankcase 23, a cylinder block 24, and two cylinder heads 25. The crankshaft 20 is held by the crankcase 23 and the cylinder block 24. The engine 8 is disposed so that a rotation axis (crankshaft axis L3) of the crankshaft 20 extends along the vertical direction. Each piston 21 is coupled to the crankshaft via the corresponding connecting rod 22. Each piston 21 is housed inside the cylinder block 24.

In plan view, the cylinder block 24 preferably has a V-shaped configuration that spreads rearward. The two cylinder heads 25 are respectively coupled to two rear end portions of the cylinder block 24. The two cylinder heads 25 correspond to the first cylinder column 16 and the second cylinder column 17, respectively. Each cylinder head 25 includes a plurality of combustion chambers 26, a plurality of intake ports 27, and a plurality of exhaust ports 28. Each intake port 27 is opened and closed by a corresponding intake valve, and each exhaust port 28 is opened and closed by a corresponding exhaust valve.

The engine 8 includes four timing gears 29 and a timing belt 30 attached to the respective timing gears 29. Of the four timing gears 29, two timing gears 29 are attached to the first cylinder column 16. The remaining two timing gears 29 are attached to the second cylinder column 17. The respective timing gears 29 are disposed at substantially the same height above the corresponding cylinder columns. Each timing gear 29 is connected to an intake valve or an exhaust valve via a cam mechanism. The rotation of the crankshaft 20 is transmitted to the respective timing gears 29 via the timing belt 30. Each intake port 27 is opened and closed at predetermined timings by the corresponding intake valve in accompaniment with the rotation of each timing gear 29. Likewise, each exhaust port 28 is opened and closed at predetermined timings by the corresponding exhaust valve in accompaniment with the rotation of each timing gear 29.

The outboard motor main body 2 includes two exhaust units (a first exhaust unit 31 and a second exhaust unit 32) housed inside the engine cover 13. The first exhaust unit 31 and the second exhaust unit 32 are disposed at an inner side of the V-shaped lines L2. The first exhaust unit 31 and the second exhaust unit 32 are coupled to the first cylinder column 16 and the second cylinder column 17, respectively. The first exhaust unit 31 and the second exhaust unit 32 are arranged right/left symmetrically. The first exhaust unit 31 and the second exhaust unit 32 preferably have the same arrangement. Each of the first exhaust unit 31 and the second exhaust unit 32 defines a portion of the exhaust passage 15. In FIG. 2, the first exhaust unit 31 is illustrated in sectional view and the second exhaust unit 32 is illustrated in plan view.

Figure 3:
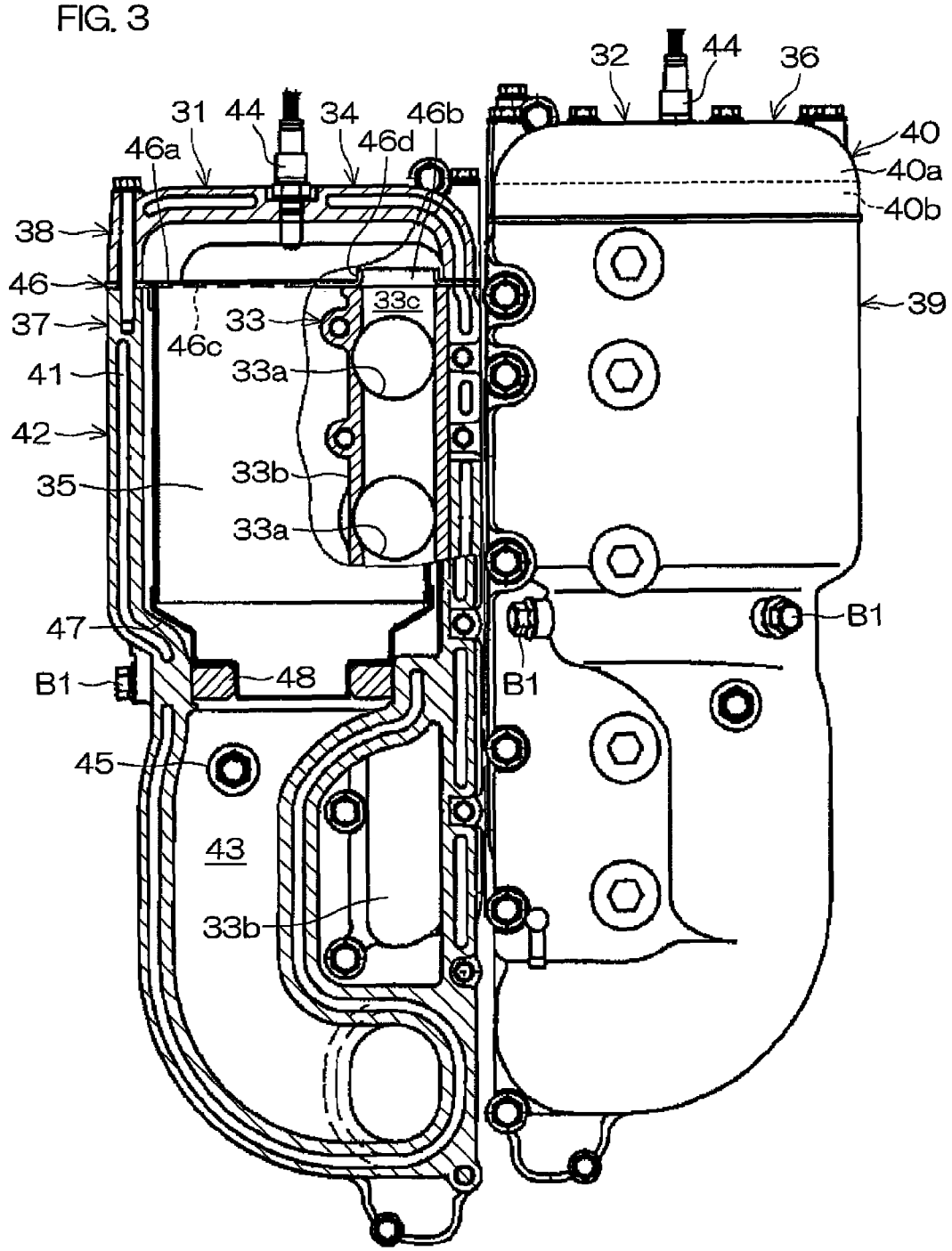
FIG. 3 is a partial sectional view of a first exhaust unit and a second exhaust unit according to the first preferred embodiment of the present invention as viewed from the rear.

FIG. 3 is a partial sectional view of the first exhaust unit 31 and the second exhaust unit 32 according to the first preferred embodiment of the present invention as viewed from the rear. An arrangement of the first exhaust unit 31 and the second exhaust unit 32 shall now be described with reference to FIG. 2 and FIG. 3.

As shown in FIG. 3, the first exhaust unit 31 includes a first housing 34 and a first catalyst 35. The first catalyst 35 is housed inside the first housing 34. The first housing 34 includes a first manifold 33, a first main body 37, and a first lid 38. Likewise, the second exhaust unit 32 includes a second housing 36 and a second catalyst. The second catalyst is housed inside the second housing 36. The second housing 36 includes a second manifold, a second main body 39, and a second lid 40. As shown in FIG. 2, the first manifold 33 is connected to the exhaust ports 28 of the four first cylinders 18a. The second manifold is connected to the exhaust ports 28 of the four second cylinders 18b. Each of the first manifold 33 and the second manifold includes a piping member that does not include a water jacket.

The first manifold 33 and the first catalyst 35 are housed inside the first main body 37 and the first lid 38. As shown in FIG. 2, the first manifold 33 and the first catalyst 35 are disposed at the same side with respect to a plane P1 (the plane perpendicular to the paper surface) that includes the central axes L1 of the respective first cylinders 18a. Likewise, the second manifold and the second catalyst are housed inside the second main body 39 and the second lid 40. The second manifold and the second catalyst are disposed at the same side with respect to a plane P2 (see FIG. 2, the plane perpendicular to the paper surface) that includes the central axes L1 of the respective second cylinders 18b. In the first preferred embodiment, the plane P1 and the plane P2 respectively include the crankshaft axis L3. The plane P1 and the plane P2 may include the crankshaft axis L3 or not include the crankshaft axis L3.

The first housing 34 and the second housing 36 are detachably coupled to the two cylinder heads 25 respectively. As shown in FIG. 3, the first housing 34 and the second housing 36 are disposed so that an upper end of the second housing 36 is positioned upward relative to an upper end of the first housing 34. As shown in FIG. 3, the first main body 37 and the second main body 39 are arranged right/left symmetrically. Likewise, the first lid 38 and the second lid 40 are arranged right/left symmetrically. The first main body 37 and the first lid 38 are an example of a second outer wall according to the first preferred embodiment of the present invention. The second main body 39 and the second lid 40 are an example of the second outer wall according to the first preferred embodiment of the present invention.

The first main body 37, the first lid 38, the second main body 39, and the second lid 40 have a substantially circular shape in plan view, respectively. Each of the first main body 37 and the second main body 39 have a tubular shape that extends substantially vertically. An upper end of the first main body 37 and an upper end of the second main body 39 are respectively open. The first lid 38 is detachably coupled to an upper end portion of the first main body 37. Likewise, the second lid 40 is detachably coupled to an upper end portion of the second main body 39. The opening of the first main body 37 and the opening of the second main body 39 are covered by the first lid 38 and the second lid 40, respectively. Each of the first lid 38 and the second lid 40 has a box shape that is open at a lower end. An interior of the first lid 38 and an interior of the second lid 40 are in communication with an interior of the first main body 37 and an interior of the second main body 39, respectively.

As shown in FIG. 2, an upper surface of the second lid 40 preferably has a stepped shape. Likewise, an upper surface of the first lid 38 preferably has a stepped shape. The second lid 40 includes an upper step portion 40a and a lower step portion 40b. The upper step portion 40a is disposed to the rear of the lower step portion 40b. The upper step portion 40a is disposed at substantially the same height as the respective timing gears 29. The lower step portion 40a is disposed at a position lower than the respective timing gears 29. A portion of the lower step portion 40b is positioned below a timing gear 29. As shown in FIG. 2, a portion of the lower step portion 40b and a portion of the timing gear 29 overlap in plan view. Interference of the timing gear 29 and the second lid 40 is prevented by the step difference provided by the upper step portion 40a and the lower step portion 40b.

Figure 4A:
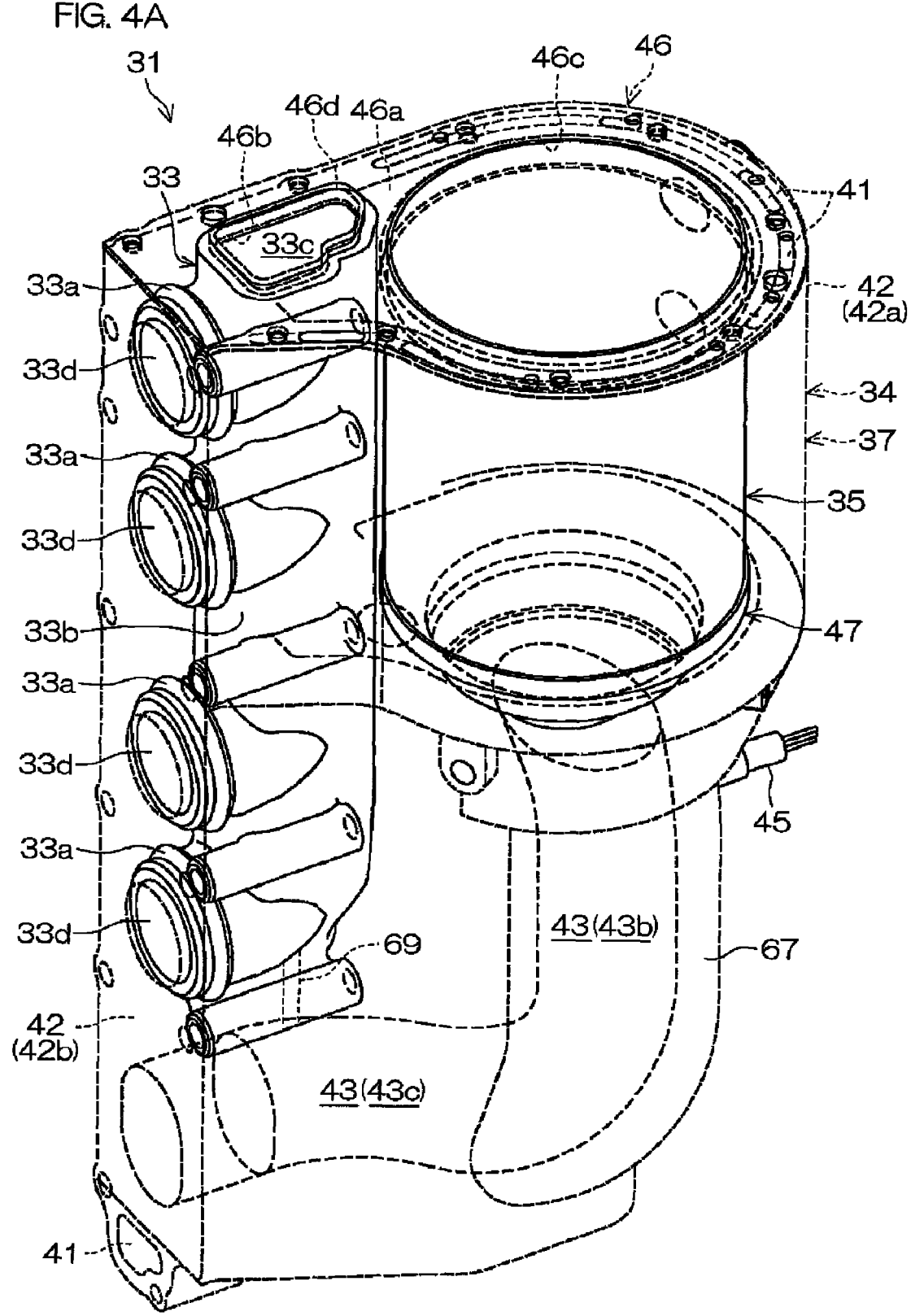
FIG. 4A is a perspective view of a portion of the first exhaust unit according to the first preferred embodiment of the present invention.
Figure 4B:
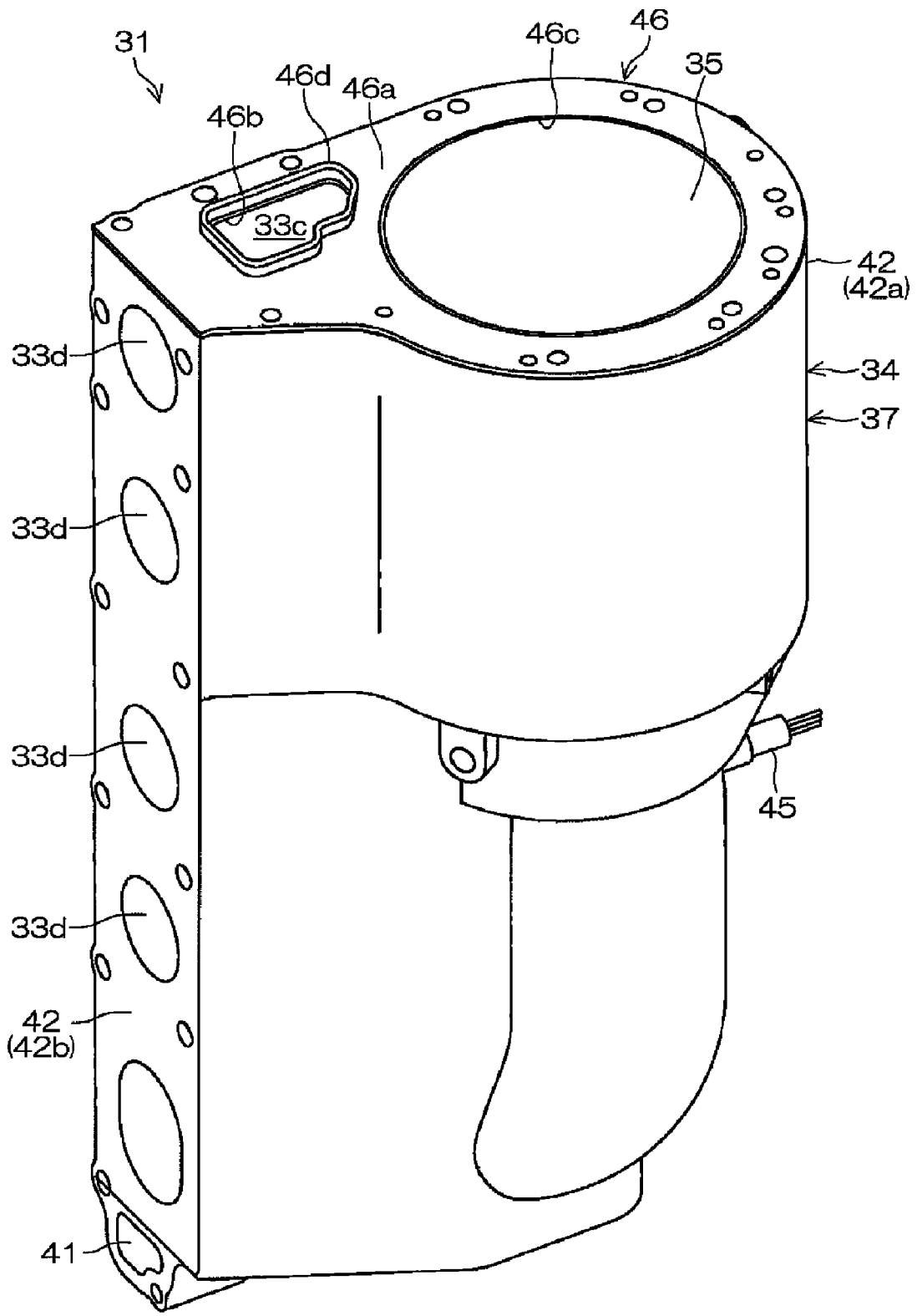
FIG. 4B is an external view of the portion of the first exhaust unit according to the first preferred embodiment of the present invention.
Figure 5:
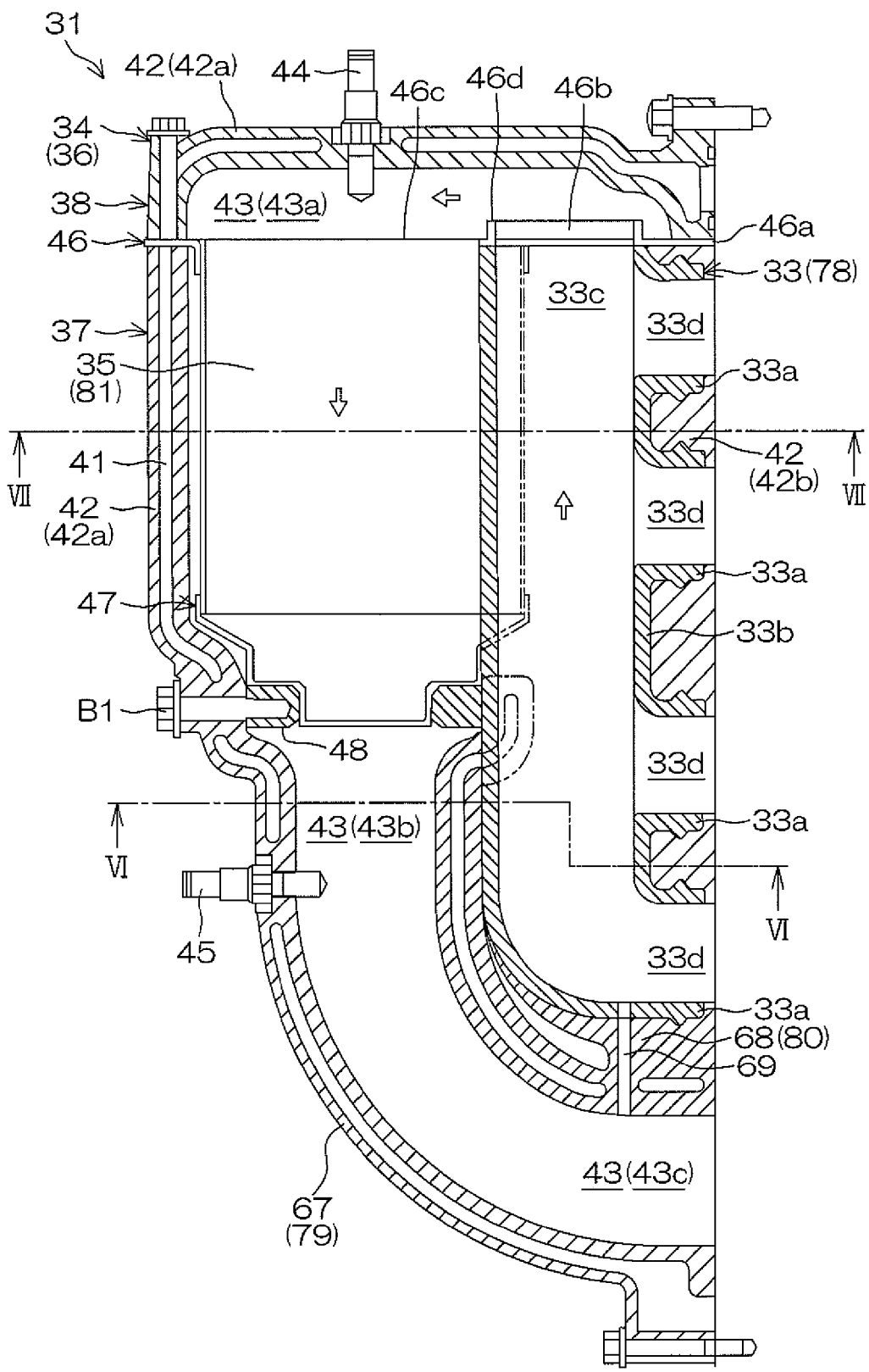
FIG. 5 is a longitudinal sectional view of the first exhaust unit taken along line V-V in FIG. 2.
Figure 6:
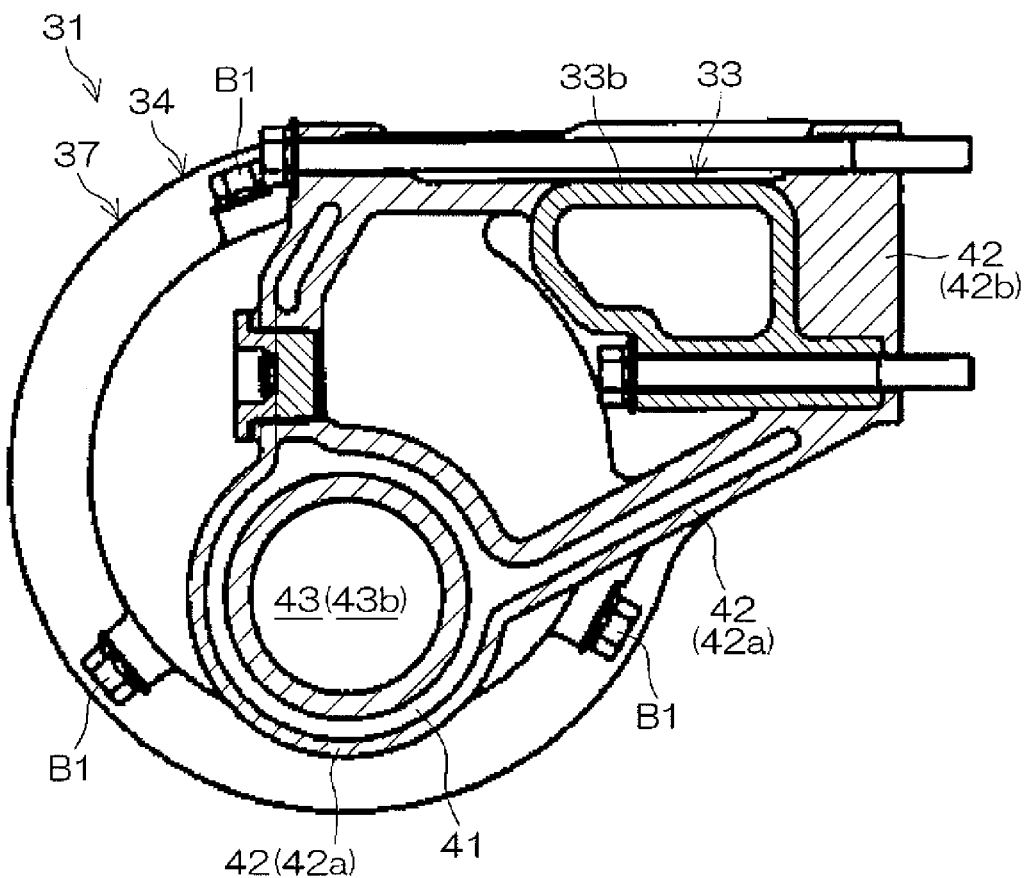
FIG. 6 is a transverse sectional view of the first exhaust unit taken along line VI-VI in FIG. 5.

FIG. 4A is a perspective view of a portion of the first exhaust unit 31 according to the first preferred embodiment of the present invention. FIG. 4B is an external view of a portion of the first exhaust unit 31 according to the first preferred embodiment of the present invention. FIG. 5 is a longitudinal sectional view of the first exhaust unit 31 taken along line V-V in FIG. 2. FIG. 6 is a transverse sectional view of the first exhaust unit 31 taken along line VI-VI in FIG. 5. An arrangement of the first exhaust unit 31 shall now be described with reference to FIG. 4A, FIG. 4B, FIG. 5, and FIG. 6. An arrangement of the second exhaust unit 32 is right/left symmetrical with respect to the arrangement of the first exhaust unit 31 and description thereof shall thus be omitted.

As shown in FIG. 4A, the first manifold 33 includes a plurality of branch portions 33a respectively connected to the plurality of exhaust ports 28 and a collecting portion 33b connected to the respective branch portions 33a. The plurality of branch portions 33a and the collecting portion 33b are respectively tubular. Each branch portion 33a is disposed along the horizontal direction. The collecting portion 33b is arranged to extend upward from the respective branch portions 33a. An upper end of the collecting portion 33b defines an exhaust exit 33c of the first manifold 33. The exhaust exit 33c of the first manifold 33 is directed upward.

The respective branch portions 33a protrude horizontally in the same direction (to the same side) from the collecting portion 33b. The plurality of branch portions 33a are aligned vertically at intervals. The branch portion 33a at the uppermost position is joined to the collecting portion 33b at a position slightly lower than an upper end of the collecting portion 33b. The branch portion 33b at the lowermost position and a lower end portion of the collecting portion 33b are joined preferably in an L-shaped configuration. An end portion of each branch portion 33a at an opposite side from the collecting portion 33b defines an exhaust entrance 33d of the first manifold 33.

Each of the first main body 37 and the first lid 38 is preferably made of a material that includes aluminum, for example. The first main body 37 and the first lid 38 are, for example, castings. As shown in FIG. 5, a portion of the first manifold 33 that includes the plurality of branch portions 33a is joined to the first main body 37 by insert molding. The first manifold 33 is preferably made of a material with heat resistance, such as stainless steel, cast iron, or other suitable material, for example. In the first preferred embodiment, the first manifold 33 is preferably made of an austenitic stainless steel, for example.

Aluminum is a material of high thermal expansion coefficient. Stainless steel is a material having heat resistance and corrosion resistance. Stainless steel is a metal having iron as a main component. A melting point of iron (approximately 1535° C.) is higher than a melting point of aluminum (approximately 660° C.). The melting point of stainless steel is thus higher than the melting point of aluminum. The first manifold 33 is thus made of a material of higher melting point than the first main body 37 and the first lid 38.

Also, an austenitic stainless steel is a material of higher thermal expansion coefficient than stainless steels of other types. The difference between thermal expansion coefficients of the first manifold 33 and the first main body 37 is thus reduced in comparison to a case where the first manifold 33 is made of a stainless steel of another type. Thermal stress that arises at a portion at which the first manifold 33 and the first main body 37 are joined is thereby reduced.

As shown in FIG. 5, the first housing 34 includes an outer wall 42 provided with a water jacket 41. The outer wall 42 is a portion that defines an outer shape of the first housing 34. The first manifold 33 and the first catalyst 35 are covered by the outer wall 42. The outer wall 42 includes a hollow portion 42a that takes up a large portion of the outer wall 42 and a solid portion 42b to which the portion of the first manifold 33 that includes the plurality of branch portions 33a is joined. An interior of the hollow portion 42a is the portion corresponding to the water jacket 41. The first housing 34 is arranged so that cooling water is supplied to the interior of the hollow portion 42a (water jacket 41). The hollow portion 42a is thereby cooled by the cooling water. As shown in FIG. 6, the first manifold 33 is housed inside the first main body 37 and the first lid 38 without contact with the hollow portion 42a.

As shown in FIG. 5, the outer wall 42 defines an exhaust passage 43. The exhaust passage 43 includes an upstream portion 43a provided in the interior of the first lid 38, and a midstream portion 43b and a downstream portion 43c that are provided in the interior of the first main body 37. The upstream portion 43a is in communication with the exhaust exit 33c of the first manifold 33. The upstream portion 43a is disposed along a horizontal plane. Also, the midstream portion 43b is arranged to extend vertically. The first catalyst 35 is disposed in the midstream portion 43b. As shown in FIG. 4A, the downstream portion 43c is arranged to extend along a horizontal plane. An end portion of the downstream portion 43c opens below the exhaust entrance 33d. The end portion of the downstream portion 43c defines an exhaust exit of the exhaust passage 43.

The first catalyst 35 is, for example, a ternary catalyst. A ternary catalyst is a catalyst that can simultaneously clean the exhaust of hydrocarbons, nitrogen oxides, and carbon monoxide in combustion in a vicinity of a theoretical air-fuel ratio. The first catalyst 35 is, for example, cylindrical. The first catalyst 35 is disposed along the vertical direction in the exhaust passage 43. As shown in FIG. 4A, the first catalyst 35 is disposed adjacent to the first manifold 33 without contact with the first manifold 33. The first catalyst 35 is disposed at the engine cover 13 side relative to the first manifold 33 (see FIG. 2). Also, as shown in FIG. 5, the first catalyst 35 is held by the first housing 34 without contact with the first housing 34.

As shown in FIG. 5, the first exhaust unit 31 includes an upstream side air-fuel ratio sensor 44 disposed at an upstream side of the first catalyst 35 and a downstream side air-fuel ratio sensor 45 disposed at a downstream side of the first catalyst 35. The air-fuel ratio is detected based on a detection value of the upstream side air-fuel ratio sensor 44. Degradation or other abnormality of the first catalyst 35 is detected based on a detection value of the downstream side air-fuel ratio sensor 45. Each of the upstream side air-fuel ratio sensor 44 and the downstream side air-fuel ratio sensor 45 is, for example, a sensor that detects an oxygen concentration in the exhaust. Each of the upstream side air-fuel ratio sensor 44 and the downstream side air-fuel ratio sensor 45 is a sensor that includes, for example, zirconia.

As shown in FIG. 5, the first exhaust unit 31 includes two flanges (an upstream side flange 46 and a downstream side flange 47) that hold the first catalyst 35. The upstream side flange 46 and the downstream side flange 47 are coupled to an upper end portion and a lower end portion, respectively, of the first catalyst 35. The upstream side flange 46 preferably has, for example, a flat plate-shape. The downstream side flange 47 has, for example, tubular shape. The upstream side flange 46 is held by the first housing 34. The downstream side flange 47 is fitted in an inner circumference of a fixing ring 48. The fixing ring 48 is fixed by, for example, a plurality of bolts B1 to the first main body 37. The downstream side flange 47 is held by the first housing 34 via the fixing ring 48. The first catalyst 35 is thus held by the first housing 34 via the upstream side flange 46, the downstream side flange 47 and the fixing ring 48.

As shown in FIG. 4B, the upstream side flange 46 includes a flat plate portion 46a, a passage hole 46b and a through hole 46c that pass through the flat plate portion 46a, and a tubular portion 46d that protrudes from the flat plat portion 46a. The flat plate portion 46a has substantially the same contour shape as an upper surface of the first main body 37. A peripheral edge portion of the flat plate portion 46a is disposed along an upper surface peripheral edge portion of the first main body 37. As shown in FIG. 5, the peripheral edge portion of the flat plate portion 46a is sandwiched by the first main body 37 and the first lid 38. The upstream side flange 46 is thereby held by the first housing 34. An interval between the flat plate portion 46a and the first main body 37 and the interval between the flat plate portion 46a and the first lid 38 are sealed by gaskets.

As shown in FIG. 4B, the flat plate portion 46a is disposed so that the passage hole 46b is positioned above the exhaust exit 33c of the first manifold 33. Also, the flat plate portion 46a is disposed so that the through hole 46c is positioned above the first catalyst 35. The passage hole 46b has substantially the same shape as the exhaust exit 33c of the first manifold 33. The through hole 46c has, for example, a circular shape with substantially the same diameter as the first catalyst 35. The flat plate portion 46a is disposed along a plane that intersects a direction in which the exhaust passes through the passage hole 46b. The tubular portion 46d of the upstream side flange 46 is disposed along an edge portion of the passage hole 46b. The tubular portion 46d protrudes from the flat plate portion 46a to an opposite side from the exhaust exit 33c of the first manifold 33.

The exhaust discharged from the respective exhaust ports 28 corresponding to the first exhaust unit 31 enters into the first manifold 33 through any of the exhaust entrances 33d of the first manifold 33. Then, as shown in FIG. 5, the exhaust rises through the interior of the collecting portion 33b and is discharged upward from the exhaust exit 33c of the first manifold 33. The exhaust that is discharged from the exhaust exit 33c enters inside the exhaust passage 43 through the passage hole 46b. The exhaust is then converted downward in direction by the upstream portion 43a and the midstream portion 43b and passes through the first catalyst 35 from above to below. The exhaust is thereby cleaned by the first catalyst 35. The cleaned exhaust is discharged from the exhaust exit of the exhaust passage 43. The exhaust discharged from the first exhaust unit 31 is discharged from the propeller 12 through a main exhaust passage 15a (see FIG. 1) provided in the interior of the outboard motor main body 2. Likewise, the exhaust discharged from the second exhaust unit 32 is discharged from the propeller 12 through the main exhaust passage 15a.

As shown in FIG. 5, the first housing 34 includes a first exhaust portion 67 that defines the exhaust passage 43, and a first communicating portion 68 that defines a first communicating passage 69 that connects the interior of the first manifold 33 with the exhaust passage 43. Likewise, the second housing 36 includes a second exhaust portion 79 that defines the exhaust passage 43, and a second communicating portion 80 that defines a second communicating passage 69 that connects the interior of the second manifold 33 with the exhaust passage 43 (see FIG. 5). The first exhaust portion 67 is an example of a first exhaust pipe according to the first preferred embodiment of the present invention, and the second exhaust portion 79 is an example of a second exhaust pipe according to the first preferred embodiment of the present invention. The first communicating portion 68 is an example of a first communicating pipe according to the first preferred embodiment of the present invention, and the second communicating portion 80 is an example of a second communicating pipe according to the first preferred embodiment of the present invention. The first communicating portion 68 connects a lower end of the first manifold 33 with a portion of the first exhaust portion 67 that is positioned downstream the first catalyst 35. As shown in FIG. 4A and FIG. 5, the first communicating passage 69 extends downward from the lower end of the first manifold 33. Further, as shown in FIG. 2, the first communicating passage 69 has a circular opening positioned at the lower end of the first manifold 33. The arrangement of the second exhaust portion 79 is the same as the arrangement of the first exhaust portion 67 and the arrangement of the second communicating portion 80 is the same as the arrangement of the first communicating portion 68. A second catalyst 81 is disposed in the second exhaust portion 79.

Figure 7:
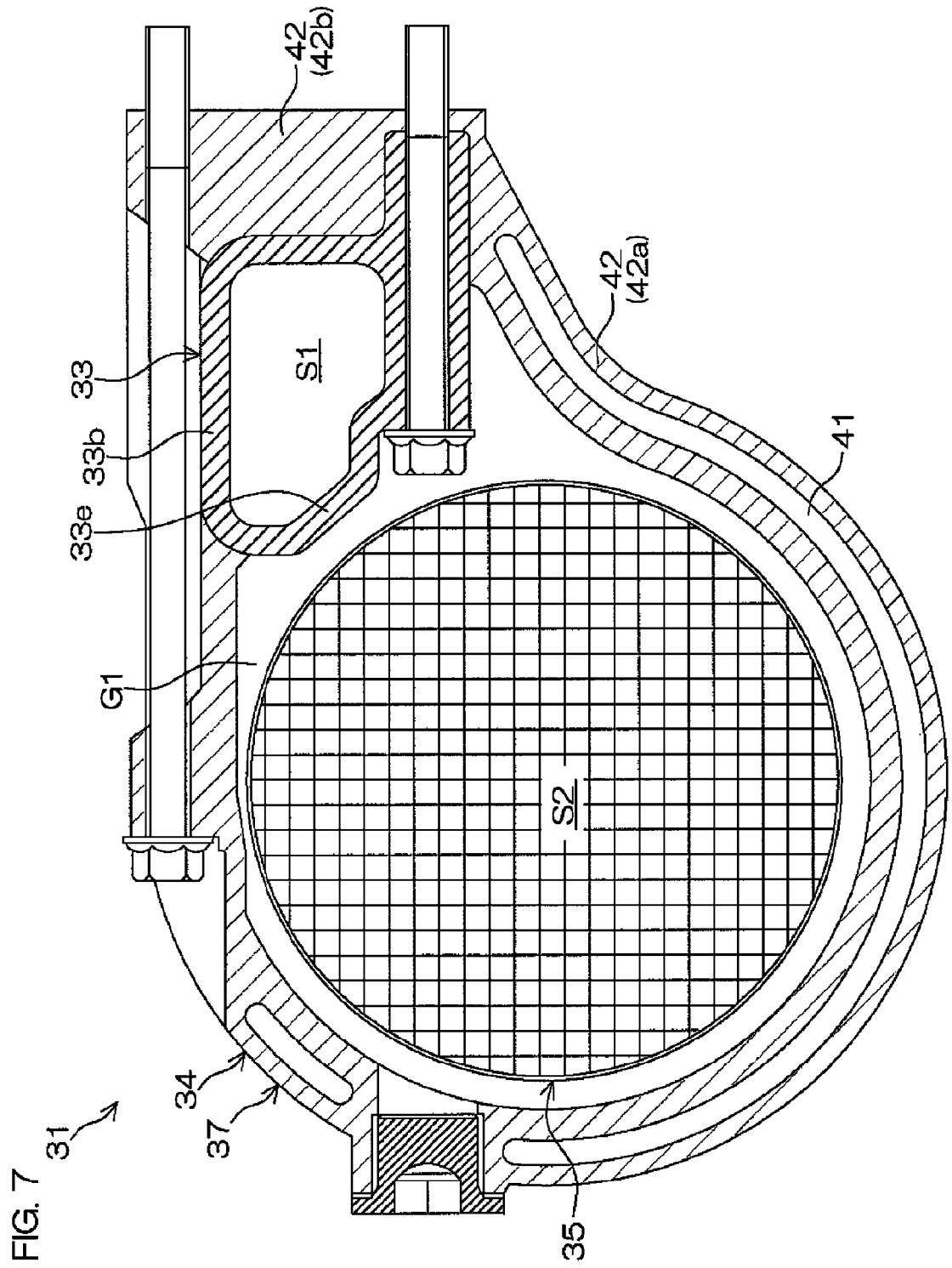
FIG. 7 is a transverse sectional view of the first exhaust unit taken along line VII-VII in FIG. 5.
Figure 8:
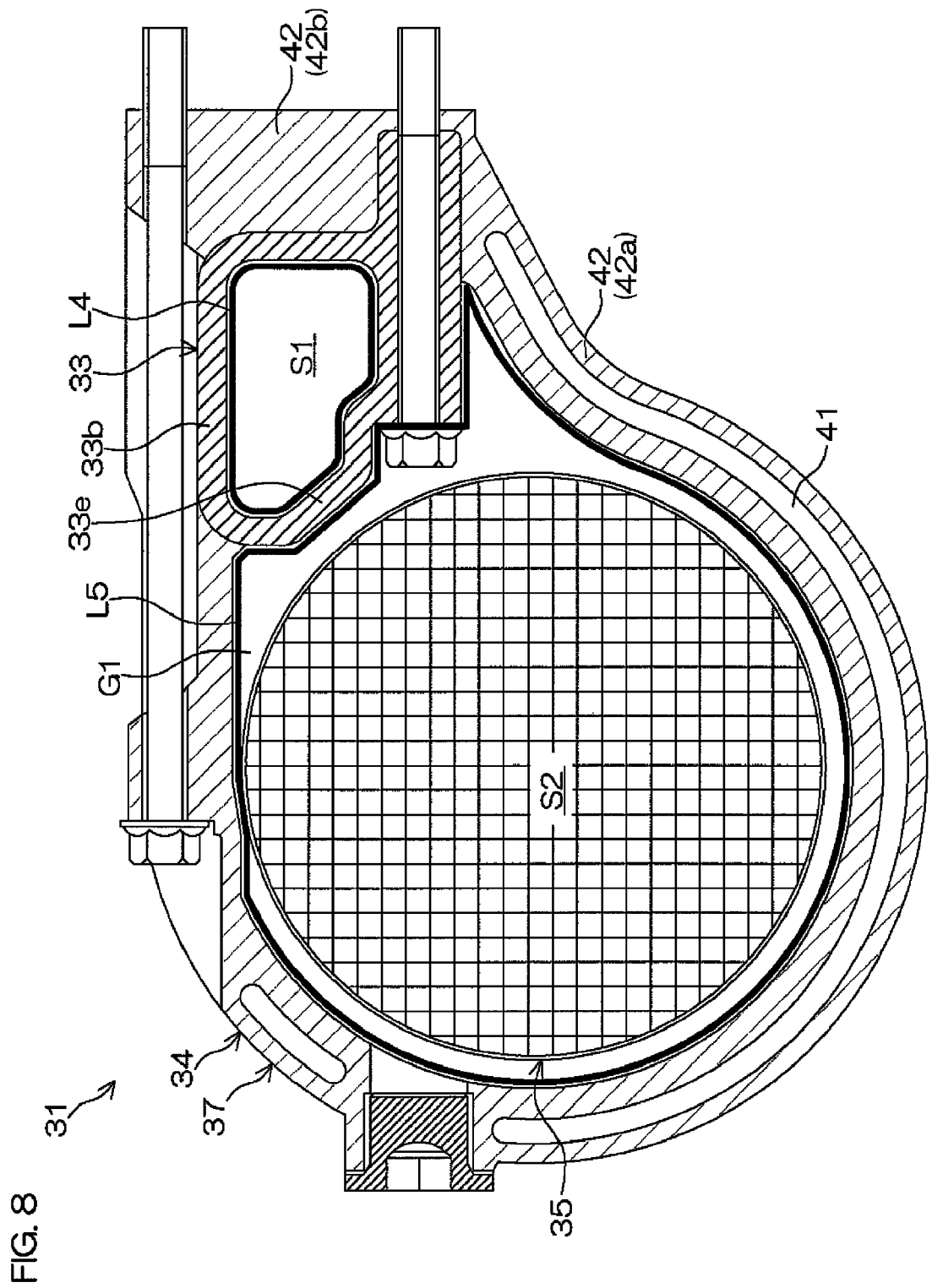
FIG. 8 is a diagram for explaining a first exhaust space and a second exhaust space according to the first preferred embodiment of the present invention.

FIG. 7 is a transverse sectional view of the first exhaust unit 31 taken along line VII-VII in FIG. 5. FIG. 8 is a diagram for explaining a first exhaust space S1 and a second exhaust space S2 according to the first preferred embodiment of the present invention. The arrangement of the first exhaust unit 31 shall now be described with reference to FIG. 7 and FIG. 8. The arrangement of the second exhaust unit 32 is right/left symmetrical with respect to the arrangement of the first exhaust unit 31 and description thereof shall thus be omitted.

An interior of the first main body 37 is partitioned by a portion (a partitioning wall 33e) of the first manifold 33. That is, the first housing 34 includes the first exhaust space S1 and the second exhaust space S2 that are partitioned by the partitioning wall 33e. The first exhaust space S1 is a space surrounded by thick lines L4 in FIG. 8. The second exhaust space S2 is a space surrounded by thick lines L5 in FIG. 8. The first exhaust space S1 and the second exhaust space S2 are disposed at the same side with respect to the plane P1 that includes the central axes L1 of the respective first cylinders 18a (see FIG. 2).

The first exhaust space S1 is defined by an inner surface of the first manifold 33. The second exhaust space S2 is defined by an inner surface of the first main body 37. The second exhaust space S2 faces the partitioning wall 33e. The partitioning wall 33e is a portion of the first manifold 33 and is the portion positioned between the first exhaust space S1 and the second exhaust space S2. The first catalyst 35 is disposed in the second exhaust space S2 at a height at which a portion of the first catalyst 35 overlaps with the first exhaust space S1 when viewed from the horizontal direction. As shown in FIG. 7, the first catalyst 35 is held by the first housing 34 without contact with the first main body 37 and the partitioning wall 33e. An entire periphery of the first catalyst 35 is thus surrounded by an annular gap G1.

As described above, with the first preferred embodiment, catalysts (for example, ternary catalysts) that exhibit a high cleaning ability at a high temperature are used as the first catalyst 35 and the second catalyst. The first catalyst 35 is disposed so as to be positioned at the same side as the first manifold 33 with respect to the plane P1 that includes the central axes L1 of the respective first cylinders 18a. Likewise, the second catalyst is disposed so as to be positioned at the same side as the second manifold with respect to the plane P2 that includes the central axes L1 of the respective second cylinders 18b. Thus, in comparison to a case where the first manifold 33 and the first catalyst 35 are disposed at mutually opposite sides with respect to the plane P1, a distance from the respective exhaust ports 28 to the first catalyst 35 is reduced. Likewise, in comparison to a case where the second manifold and the second catalyst are disposed at mutually opposite sides with respect to the plane P2, a distance from the respective exhaust ports 28 to the second catalyst is reduced. Lowering of the temperature of the exhaust that passes through the first catalyst 35 and the second catalyst is thus reduced, and the first catalyst 35 and the second catalyst are warmed adequately by the exhaust. Further, the first catalyst 35 and the first exhaust space S1 are adjacent, and thus the first catalyst 35 is warmed adequately by the heat transmitted from the first manifold 33. Likewise, the second catalyst is warmed adequately by the heat transmitted from the second manifold. Exhaust cleaning efficiency is thus improved.

Also, each of the first housing 34 and the second housing 36 includes the outer wall 42 provided with the water jacket 41. The respective outer walls 42 are cooled by the cooling water. The first manifold 33 and the first catalyst 35 are disposed at the inner side of the outer wall 42 of the first housing 34. Likewise, the second manifold and the second catalyst are disposed at the inner side of the outer wall 42 of the second housing 36. The heat of the first manifold 33, the first catalyst 35, the second manifold, and the second catalyst is thus prevented from being transmitted to an exterior of the first housing 34 and the second housing 36. Temperature increases of the engine cover 13 and equipment housed inside the engine cover 13 are thus suppressed and prevented. As mentioned above, a large portion of the engine cover 13 is preferably made, for example, of a material that includes a synthetic resin. Thus, by prevention and suppression of the temperature increase of the engine cover 13, deformation of the engine cover 13 is prevented.

Also, in the first preferred embodiment, each of the first manifold 33 and the second manifold is made of a piping material that does not include a water jacket. Thus, in comparison to a case where a water jacket is provided in each of the first manifold 33 and the second manifold, temperature decrease of the exhaust passing through the interiors of the first manifold 33 and the second manifold is reduced. Exhaust of higher temperature thus passes through the first catalyst 35 and the second catalyst. The first catalyst 35 and the second catalyst are thereby warmed adequately. Further, the cooling water is not supplied to the partitioning wall 33e and thus the heat of the exhaust is transmitted efficiently from the first exhaust space S1 to the second exhaust space S2. The first catalyst 35 and the second catalyst are thereby warmed adequately. The exhaust cleaning efficiency is thereby improved further.

The exhaust generated in accompaniment with the combustion of gasoline or other fuel containing hydrogen atoms contains water. When such exhaust is cooled, the exhaust is condensed and condensed water may accumulate. Also, the condensed water may undergo backflow from the first manifold 33 and the second manifold to the interior of the engine 8 and the engine 8 may thereby misfire. Thus, by prevention and suppression of the temperature decrease of the exhaust inside the first manifold 33 and the second manifold, formation of condensed water and misfiring of the engine 8 are suppressed and prevented.

Also, in the first preferred embodiment, the outer wall 42 of each of the first housing 34 and the second housing 36 includes the hollow portion 42a that is provided with the water jacket 41. Each hollow portion 42a is cooled by the cooling water. The first manifold 33 and the second manifold are not in contact with the hollow portions 42a. The first manifold 33 and the second manifold are thus insulated from the hollow portions 42a. Cooling of the first manifold 33 and the second manifold by the hollow portions 42a is thus prevented. Temperature decreases of the exhaust passing through the first manifold 33 and the second manifold are thus prevented and minimized. Exhaust of higher temperature thus passes through the first catalyst 35 and the second catalyst.

Also, as mentioned above, the exhaust passage 43 is defined by the outer wall 42 that is provided with the water jacket 41. The outer wall 42 is heated by the exhaust that flows through the exhaust passage 43 and is cooled by the cooling water flowing through the water jacket 41. Meanwhile, the first manifold 33 and the second manifold are exposed to the high temperature exhaust discharged from the engine 8. The first manifold 33 and the second manifold are thus ordinarily higher in temperature than the outer wall 42. In the first preferred embodiment, the first manifold 33 and the second manifold are preferably made of a material of higher melting point than the first main body 37, the first lid 38, the second main body 39, and the second lid 40. Deformation of the first manifold 33 and the second manifold due to heat is thereby prevented.

Also, in the first preferred embodiment, the engine 8 includes the first cylinders 18a and the second cylinders 18b that are arranged in a V-shaped configuration. The central axes L1 of the first cylinders 18a and the central axes L1 of the second cylinders 18b define the V-shaped lines L2. The first housing 34 and the second housing 36 are disposed at the inner side of the V-shaped lines L2. Thus, in comparison to a case where the first housing 34 and the second housing 36 are disposed at the outer side of the V-shaped lines L2, a size of an entirety of the engine 8, the first housing 34, and the second housing 36 is reduced. The engine cover 13 can thereby be made compact and consequently, the outboard motor 1 can be made compact.

The fuel injector 19 and other equipment housed inside the engine cover 13 are disposed at the outer side of the V-shaped lines L2, and the equipment are thus separated from the first housing 34 and the second housing 36 by the first cylinders 18a and the second cylinders 18b. Transmission of heat from the first manifold 33, the first catalyst 35, the second manifold, and the second catalyst to the equipment housed inside the engine cover 13 is thus prevented, and the temperature increase of the equipment is reduced.

Also, in the first preferred embodiment, the exhaust exits 33c of the first manifold 33 and the second manifold are directed upward. The exhaust flowing inside the first manifold 33 and the second manifold are discharged upward from the exhaust exits 33c. The exhaust then passes through the passage hole 46b of the upstream side flange 46 and moves into the exhaust passage 43. The exhaust passage 43 is defined by the outer wall 42 that is provided with the water jacket 41. The exhaust that has moved into the exhaust passage 43 is thus cooled inside the exhaust passage 43 by the outer wall 42. Condensed water may thus accumulate or otherwise be present inside the exhaust passage 43. Also, the condensed water may move along the flat plate portion 46a of the upstream side flange 46 and toward the passage hole 46b. However, the condensed water that moves toward the passage hole 46b is blocked by the tubular portion 46d of the upstream side flange 46. Backflow of the condensed water present inside the exhaust passage 43 is thus prevented and the condensed water is prevented from entering into the engine 8 via the first manifold 33 and the second manifold. Misfiring of the engine 8 is thereby prevented.

Also, in the first preferred embodiment, the collecting portion 33b of the first manifold 33 and the upstream portion 43a and the midstream portion 43b of the exhaust passage 43 are disposed in an inverted U-shaped arrangement (see FIG. 5). That is, the first manifold 33 and the outer wall 42 define a U-shaped passage having an inverted U-shape. Likewise, the second manifold and the outer wall 42 define a U-shaped passage having an inverted U-shape. The first catalyst 35 and the second catalyst are disposed inside the corresponding U-shaped passage. Thus, for example, in comparison to a case where the first manifold 33 and the second manifold are arranged to extend downward from the respective exhaust ports 28, the positions of the first catalyst 35 and the second catalyst can be made higher. Water that rises inside the exhaust passage 15 can thereby be prevented from attaching to the first catalyst 35 and the second catalyst.

Specifically, a pressure inside the exhaust passage 15 may become negative due, for example, to pulsation of the exhaust. When the pressure inside the exhaust passage 15 becomes negative, the water that enters into a downstream portion of the exhaust passage 15 may rise and reach a vicinity of the engine 8. That is, when the pressure inside the exhaust passage 15 becomes negative, the water approaches the first catalyst 35 and the second catalyst. Thus, by disposing the first catalyst 35 and the second catalyst at higher positions, the water rising inside exhaust passage 15 can be prevented from attaching to the first catalyst 35 and the second catalyst. Also, by disposing the first catalyst 35 and the second catalyst at higher positions, the upstream side air-fuel ratio sensor 44 and the downstream side air-fuel ratio sensor 45 can be disposed at higher positions. Wetting of the upstream side air-fuel ratio sensor 44 and the downstream side air-fuel ratio sensor 45 can thereby be prevented.

Also, when condensed water accumulates or otherwise is present inside the collecting portion 33b or water enters inside the collecting portion 33b in a case where the collecting portion 33b is arranged to extend upward from the respective branch portions 33a, the water may undergo backflow (descend) inside the first manifold 33 and the second manifold. The water may thus enter inside the engine 8 and the engine 8 may thereby misfire. However, the first manifold 33 and the second manifold are made of piping members that do not include a water jacket and thus decreases of the temperature of the exhaust passing through the interiors of the first manifold 33 and the second manifold are minimized and prevented. Accumulation of condensed water inside the first manifold 33 and the second manifold is thus prevented. Further, the upstream side flange 46 prevents, by the tubular portion 46d, the entry of the condensed water, present inside the exhaust passage 43, into the first manifold 33 and the second manifold. Misfire of the engine 8 is thereby prevented.

Also, in the first preferred embodiment, the exhaust ports 28 of the four first cylinders 18a and the exhaust ports 28 of the four second cylinders 18b are respectively connected to two collecting passages (interiors of the collecting portions 33b of the first manifold 33 and the second manifold). Further, the two collecting passages are connected to the main exhaust passage 15a (see FIG. 1). The exhaust passage 15 is thus arranged so that a plurality of passages are collected in stepwise manner toward the downstream side. Thus, in comparison to a case where a plurality of passages respectively connected to a plurality of exhaust ports are collected at once, the distance from the respective exhaust ports 28 to the final collection position is long.

Exhaust interference is a phenomenon in which the pressure of the exhaust discharged from a certain cylinder interferes with exhaust from another cylinder. Exhaust interference occurs, for example, when a plurality of cylinders that are substantially the same in combustion cycle phase are connected to an exhaust passage in common. The first manifold 33 and the second manifold are respectively connected to the plurality of cylinders 18 that differ mutually in combustion cycle phase. Exhaust interference is thus prevented. Exhaust interference also occurs in a case where a distance, from exhaust ports of a plurality of cylinders, which are substantially the same in combustion cycle phase, to an exhaust collection position, is short. Thus, even in a case where cylinders that are substantially the same in combustion cycle phase are included among the first and second cylinders 18a and 18b, exhaust interference is prevented because the distance from the respective exhaust ports 28 to the final collection position is long. Lowering of an output of the engine 8 is thereby prevented.

Also, in the first preferred embodiment, the first catalyst 35 is disposed adjacent to the first manifold 33 without contact with the first manifold 33. Likewise, the second catalyst is disposed adjacent to the second manifold without contact with the second manifold. The first catalyst 35 and the second catalyst are thus warmed by the heat of the first manifold 33 and the second manifold. Also, the temperatures of the first catalyst 35 and the second catalyst are prevented from increasing more than necessary because the first catalyst 35 and the second catalyst do not contact the first manifold 33 and the second manifold, respectively. Further, the first catalyst 35 and the second catalyst are held by the first housing 34 and the second housing 36 without contact with the first housing 34 and the second housing 36. The first housing 34 and the second housing 36 include the outer walls 42 that are provided with the water jackets 41. The first catalyst 35 and the second catalyst are thus prevented from being cooled by the first housing 34 and the second housing 36, respectively. The temperatures of the first catalyst 35 and the second catalyst are thereby maintained at high temperatures. The exhaust cleaning efficiency is thus improved.

Also, in the first preferred embodiment, the first housing 34 includes the first exhaust portion 67 that corresponds to the first exhaust pipe, and the second housing 36 includes the second exhaust portion 79 that corresponds to the second exhaust pipe. The first catalyst 35 and the second catalyst 81 are disposed in the first exhaust portion 67 and the second exhaust portion 79, respectively. The exhaust guided into the first exhaust portion 67 from the first manifold 33 is cleaned by the first catalyst 35, and the exhaust guided into the second exhaust portion 79 from the second manifold 78 is cleaned by the second catalyst 81. The first exhaust portion 67 and the second exhaust portion 79 are disposed at the inner side of the V-shaped lines L2 defined by the central axes L1 of the first cylinders 18a and the central axes L1 of the second cylinders 18b. The first exhaust portion 67 and the second exhaust portion 79 are thus close to the exhaust ports 28 of the engine 8 and exhaust of high temperature is guided into the first exhaust portion 67 and the second exhaust portion 79. The first catalyst 35 and the second catalyst 81 can thus be activated at an early stage.

Further, in the first preferred embodiment, the first housing 34 includes the first communicating portion 68 corresponding to the first communicating pipe, and the second housing 36 includes the second communicating portion 80 corresponding to the second communicating pipe. The first communicating portion 68 connects the lower end of the first manifold 33 and the first exhaust portion 67, and the second communicating portion 80 connects the lower end of the second manifold 78 and the second exhaust portion 79. Thus, even if condensed water accumulates or otherwise is present inside the first manifold 33 and the second manifold 78, the condensed water is discharged from the first manifold 33 and the second manifold 78 into the first exhaust portion 67 and the second exhaust portion 79 through the first communicating portion 68 and the second communicating portion 80. The condensed water can thus be prevented from entering into the first cylinders 18a and the second cylinders 18b from the first manifold 33 and the second manifold 78 through the exhaust ports 28. Further, the first communicating portion 68 is connected to the portion of the first exhaust portion 67 that is positioned downstream the first catalyst 35 and thus the condensed water is discharged to the downstream side of the first catalyst 35 through the first communicating portion 68. Likewise, the second communicating portion 80 is connected to the portion of the second exhaust portion 79 that is positioned downstream the second catalyst 81 and thus the condensed water is discharged to the downstream side of the second catalyst 81 through the second communicating portion 80. The condensed water can thus be prevented from attaching to the first catalyst 35 and the second catalyst 81.

Second Preferred Embodiment

Figure 9:
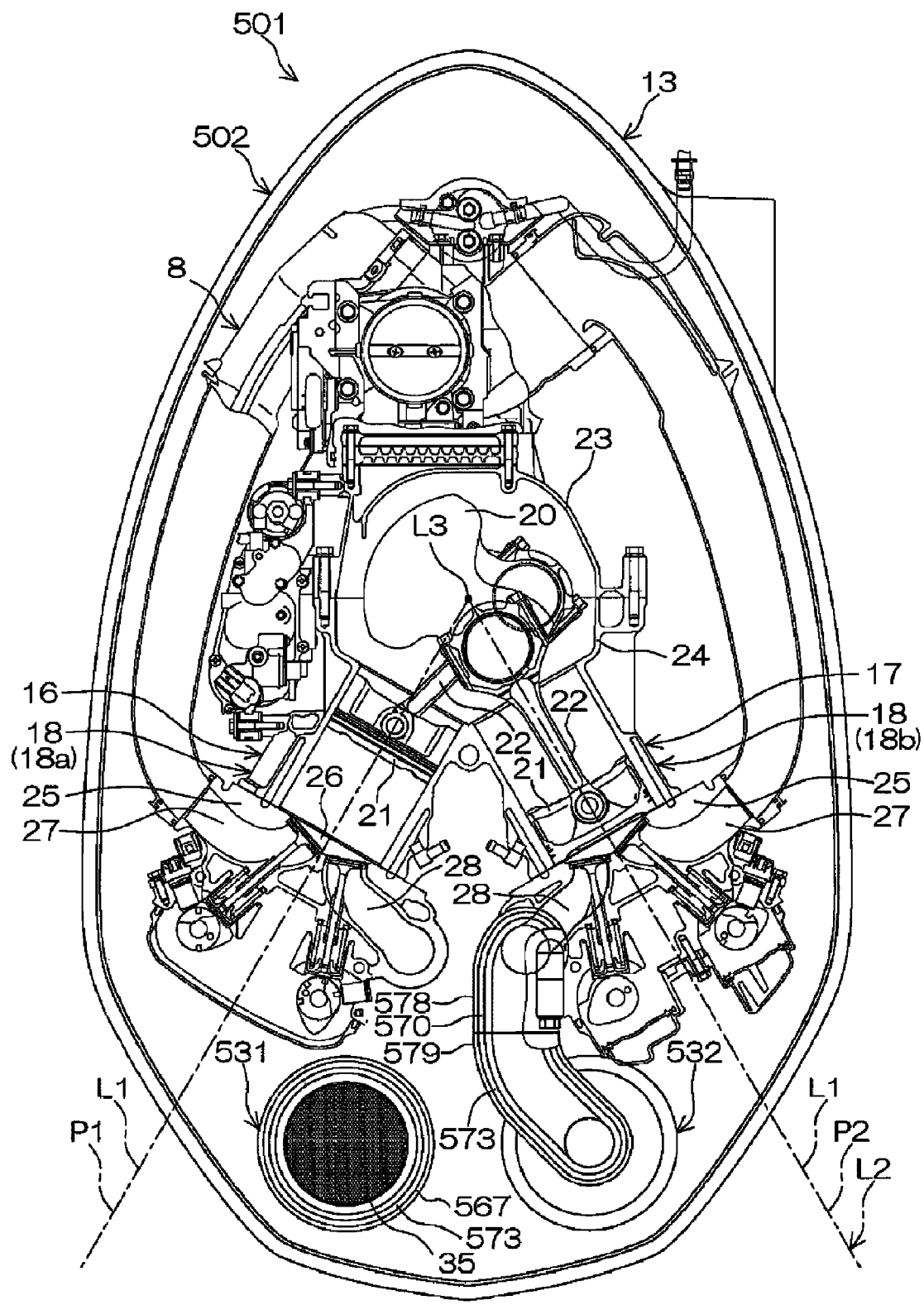
FIG. 9 is a partial sectional view of an outboard motor according to a second preferred embodiment of the present invention.
Figure 10:
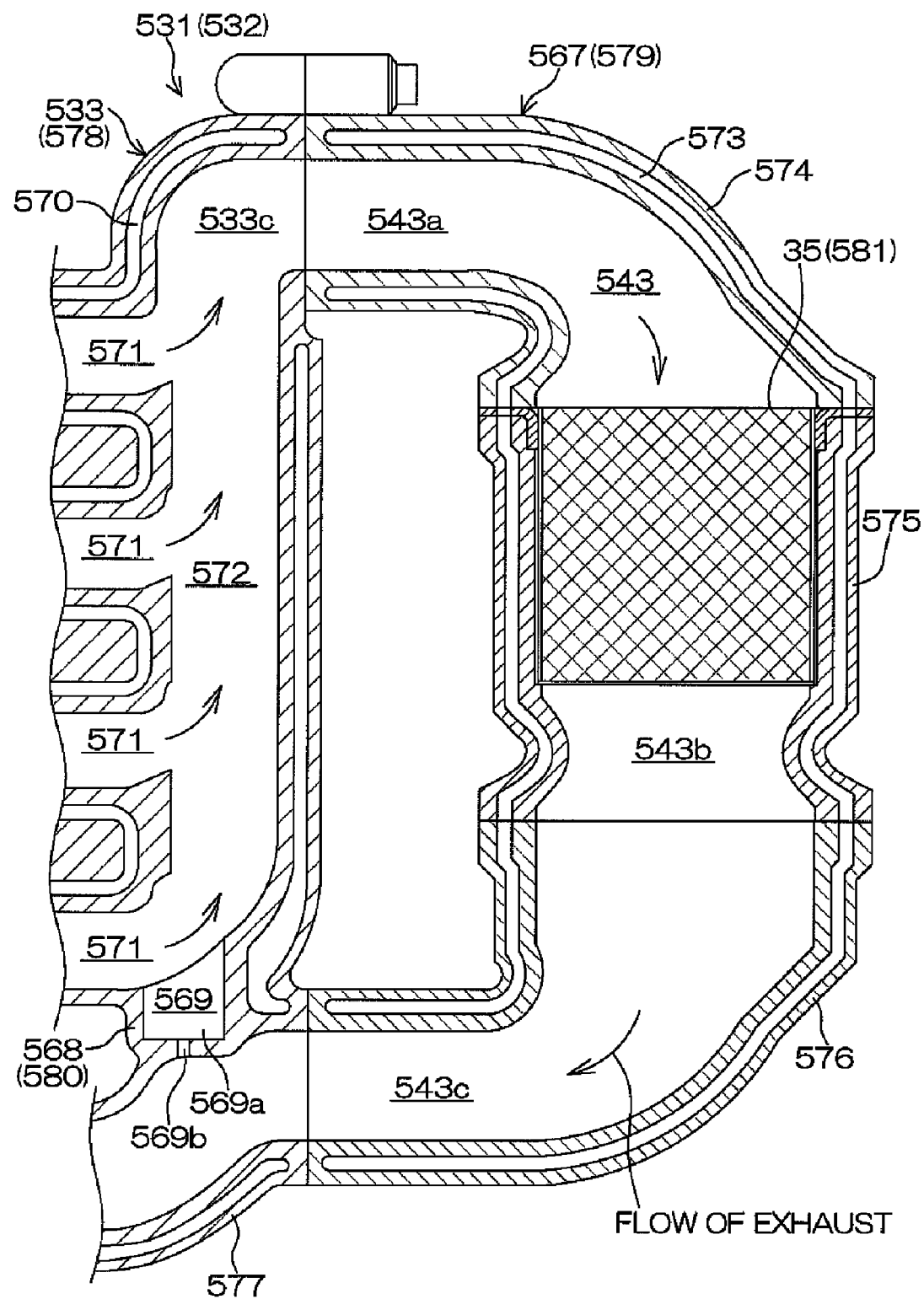
FIG. 10 is a longitudinal sectional view of first and second exhaust units according to the second preferred embodiment of the present invention.

FIG. 9 is a partial sectional view of an outboard motor 501 according to a second preferred embodiment of the present invention. FIG. 10 is a longitudinal sectional view of a first exhaust unit 531 and a second exhaust unit 532 according to the second preferred embodiment of the present invention. In FIG. 9, hatching that indicates a section is omitted. Further, in FIG. 9, the first exhaust unit 531 and the second exhaust unit 532 are sectioned at mutually different heights. In FIG. 9 and FIG. 10, component portions that are equivalent to respective portions shown in FIGS. 1 to 8 of the above description are provided with the same reference symbols as in FIG. 1, etc. and description thereof shall be omitted.

The second preferred embodiment and the first preferred embodiment mainly differ in the arrangements of the first and second exhaust units. Put in another way, the outboard motor 501 according to the second preferred embodiment preferably has the same arrangement as the outboard motor 1 according to the first preferred embodiment in regard to arrangements of portions other than the first and second exhaust units. Thus, as shown in FIG. 9, the engine 8 included in the outboard motor 501 according to the second preferred embodiment includes the plurality (for example, preferably four in the second preferred embodiment) of first cylinders 18a that are aligned vertically, the plurality (for example, preferably four in the second preferred embodiment) of second cylinders 18b that are aligned vertically, and the plurality of exhaust ports 28 into which the exhaust from first cylinder 18a and the second cylinder 18b is guided.

Also, an outboard motor main body 502 according to the second preferred embodiment includes the first exhaust unit 531 corresponding to the plurality of first cylinders 18a. As shown in FIG. 10, the first exhaust unit 531 includes a first manifold 533, a first exhaust pipe 567, and a first communicating pipe 568. As shown in FIG. 9, the first manifold 533 is disposed at the inner side of the V-shaped lines L2. As shown in FIG. 10, the first manifold 533 includes a water jacket 570 that is supplied with cooling water. Further, the first manifold 533 includes a plurality of branch passages 571 and a collecting passage 572 provided in an interior of the first manifold 533. The plurality of branch passage 571 are respectively connected to the plurality of exhaust ports 28. Further, the plurality of branch passages 571 are respectively connected to the collecting passage 572. The plurality of branch passages 571 extend horizontally and the collecting passage 572 extends vertically. An exhaust exit 533c of the first manifold 533 is provided at an upper end portion of the collecting passage 572. The first manifold 533 thus guides and collects the exhaust, guided from the plurality of the first cylinders 18a via the exhaust ports 28, from below to above.

The first exhaust pipe 567 is connected to the exhaust exit 533c of the first manifold 533. The first exhaust pipe 567 includes a water jacket 573 that is supplied with cooling water. The first exhaust pipe 567 defines an exhaust passage 543. The exhaust passage 543 includes an upstream portion 543a connected to the exhaust exit 533c of the first manifold 533, a midstream portion 543b connected to the upstream portion 543a, and a downstream portion 543c connected to the midstream portion 543b. The upstream portion 543a extends in a direction of separating from the first manifold 533. The midstream portion 543b extends vertically. A space is provided between the midstream portion 543b and the first manifold 533, and the midstream portion 543b is not in contact with the first manifold 533. The first catalyst 35 is disposed in the midstream portion 543b. The downstream portion 543c extends from a lower end of the midstream portion 543b toward the first manifold 533 and passes below the first manifold 533. The first exhaust pipe 567 guides the exhaust, which has been guided from the first manifold 533, from above to below. The exhaust guided by the first exhaust pipe 567 flows into the main exhaust passage 15a (see FIG. 1).

In the second preferred embodiment, the first exhaust pipe 567 includes a plurality of piping (a first piping 574, a second piping 575, a third piping 576, and a fourth piping 577). The first piping 574 defines the upstream portion 543a of the exhaust passage 543. The second piping 575 defines the midstream portion 543b of the exhaust passage 543. The third piping 576 and the fourth piping 577 define the downstream portion 543c of the exhaust passage 543. The first catalyst 35 is disposed inside the second piping 575. The third piping 576 and the fourth piping 577 are thus positioned downstream the first catalyst 35. The first exhaust pipe 567 may include a plurality of piping as in the second preferred embodiment or may be a single piping.

A first communicating pipe 568 connects a lower end of the first manifold 533 and a portion of the first exhaust pipe 567 that is positioned downstream the first catalyst 35. That is, the first communicating pipe 568 connects the lower end of the first manifold 533 and the fourth piping 577. The first communicating pipe 568 is preferably integral with the first manifold 533 and the fourth piping 577. The first communicating pipe 568 may be integral with the first manifold 533 and the fourth piping 577 as in the second preferred embodiment or may be a separate member from the first manifold 533 and the fourth piping 577. The first communicating pipe 568 defines a first communicating passage 569 that connects an interior of the first manifold 533 and the exhaust passage 543. The first communicating passage 569 includes a first flow passage 569a that extends downward from the lower end of the first manifold 533, and a second flow passage 569b that extends downward from a lower end of the first flow passage 569a. The first flow passage 569a has a greater flow passage area than a flow passage area of the second flow passage 569b. The first communicating passage 569 is thus arranged to decrease stepwise in flow passage area with distance away from the first manifold 533.

The outboard motor main body 502 according to the second preferred embodiment also includes the second exhaust unit 532 corresponding to the plurality of second cylinders 18b. As shown in FIG. 9, the first exhaust unit 531 and the second exhaust unit 532 are disposed across an interval in the right/left direction. The first exhaust unit 531 and the second exhaust unit 532 are right/left symmetrical, and the second exhaust unit 532 has the same arrangement as the first exhaust unit 531. Thus, as shown in FIG. 10, the second exhaust unit 532 includes a second manifold 578, a second exhaust pipe 579, and a second communicating pipe 580. A second catalyst 581 is disposed inside the second exhaust pipe 579. The arrangements of the second manifold 578, the second exhaust pipe 579, and the second communicating pipe 580 are the same as the arrangements of the first manifold 533, the first exhaust pipe 567, and the first communicating pipe 568, respectively.

As described above, with the second preferred embodiment, the first exhaust unit 531 includes the first exhaust pipe 567 and the second exhaust unit 532 includes the second exhaust pipe 579. The first catalyst 35 and the second catalyst 581 are disposed in the first exhaust pipe 567 and the second exhaust pipe 579. The first catalyst 35 and the second catalyst 581 are disposed in the first exhaust pipe 567 and the second exhaust pipe 579, respectively. The exhaust guided from the first manifold 533 to the first exhaust pipe 567 is cleaned by the first catalyst 35, and the exhaust guided from the second manifold 578 to the second exhaust pipe 579 is cleaned by the second catalyst 581. The first exhaust pipe 567 and the second exhaust pipe 579 are disposed at the inner side of the V-shaped lines L2 defined by the central axes L1 of the first cylinders 18a and the central axes L1 of the second cylinders 18b. The first exhaust pipe 567 and the second exhaust pipe 579 are thus close to the exhaust ports 28 of the engine 8, and exhaust of high temperature is guided into the first exhaust pipe 567 and the second exhaust pipe 579. The first catalyst 35 and the second catalyst 581 can thus be activated at an early stage.

Further, the first exhaust unit 531 includes the first communicating pipe 568, and the second exhaust unit 532 includes the second communicating pipe 580. The first communicating pipe 568 connects the lower end of the first manifold 533 and the first exhaust pipe 567, and the second communicating pipe 580 connects the lower end of the second manifold 578 and the second exhaust pipe 579. Thus, even if condensed water accumulates or otherwise present inside the first manifold 533 and the second manifold 578, the condensed water is discharged from the first manifold 533 and the second manifold 578 into the first exhaust pipe 567 and the second exhaust pipe 579 through the first communicating pipe 568 and the second communicating pipe 580. Misfire of the engine 8 can thereby be prevented. Further, the first communicating pipe 568 is connected to the portion of the first exhaust pipe 567 that is positioned downstream the first catalyst 35 and thus the condensed water is discharged to the downstream side of the first catalyst 35 through the first communicating pipe 568. Likewise, the second communicating pipe 580 is connected to the portion of the second exhaust pipe 579 that is positioned downstream the second catalyst 581 and thus the condensed water is discharged to the downstream side of the second catalyst 581 through the second communicating pipe 580. The condensed water can thus be prevented from attaching to the first catalyst 35 and the second catalyst 581.

Reference Embodiment

Figure 11:
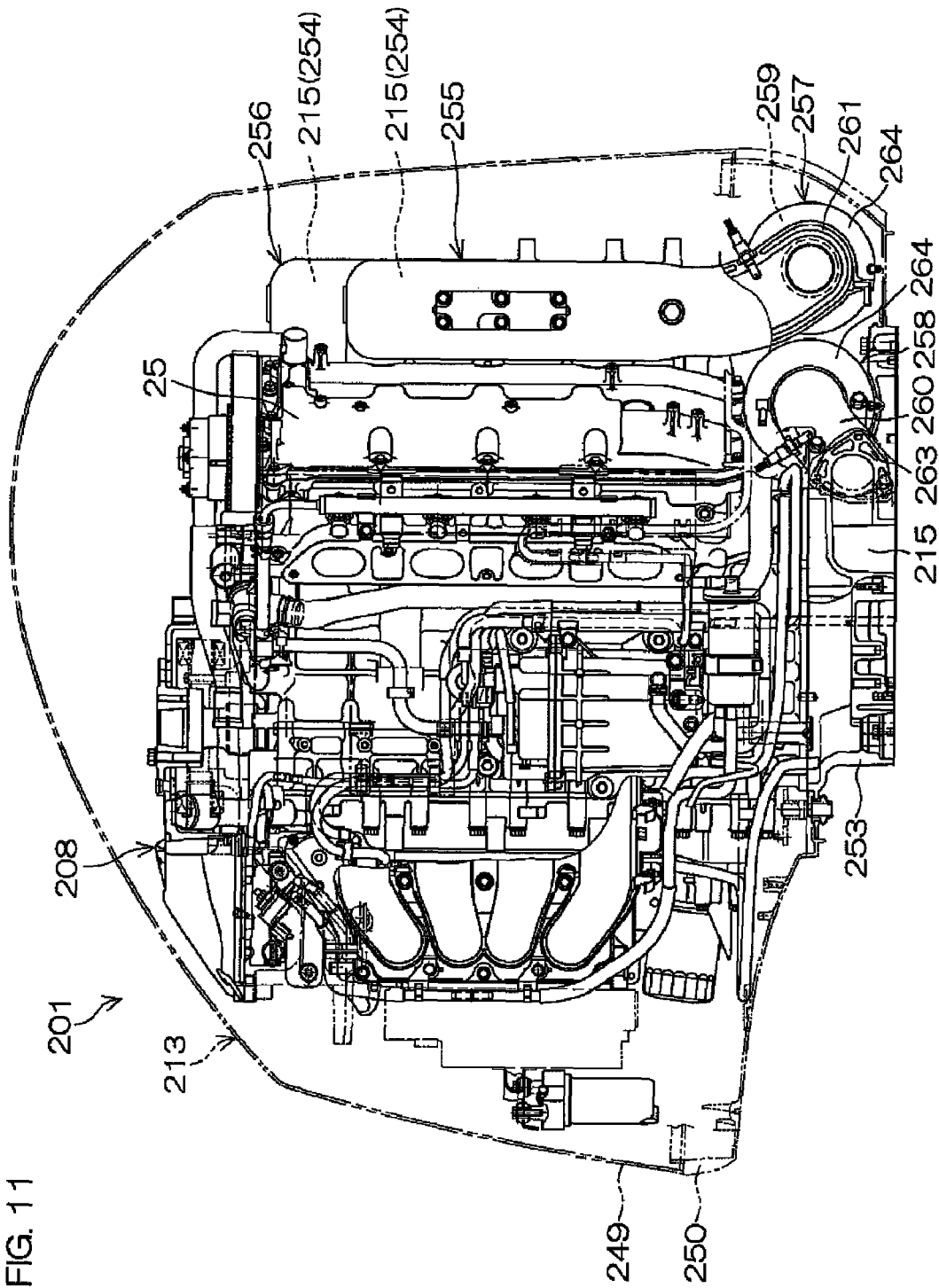
FIG. 11 is a side view of a portion of an outboard motor according to a reference embodiment of the present invention.
Figure 12:
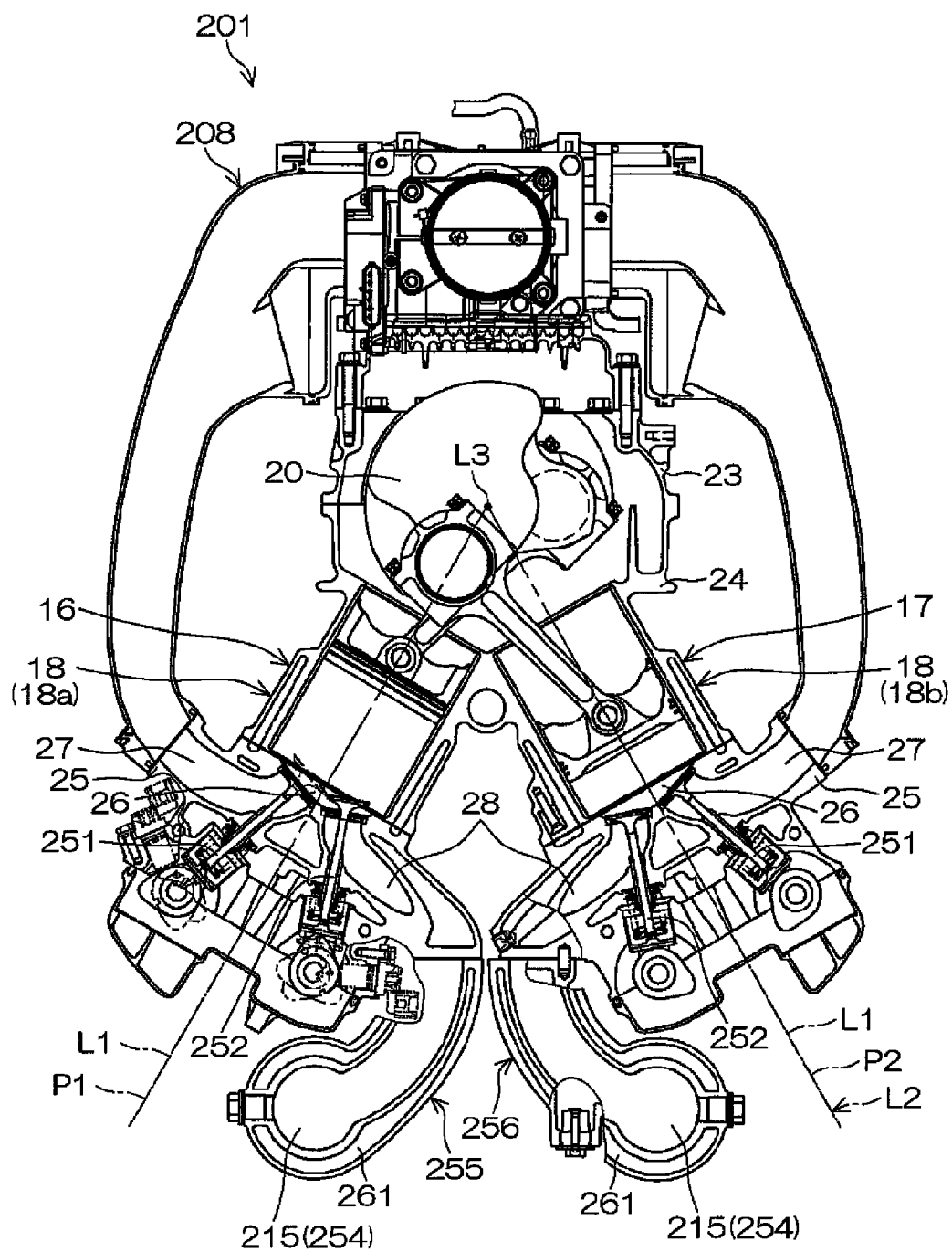
FIG. 12 is a partial sectional view of an engine and an arrangement related thereto included in the outboard motor according to the reference embodiment of the present invention.
Figure 13:
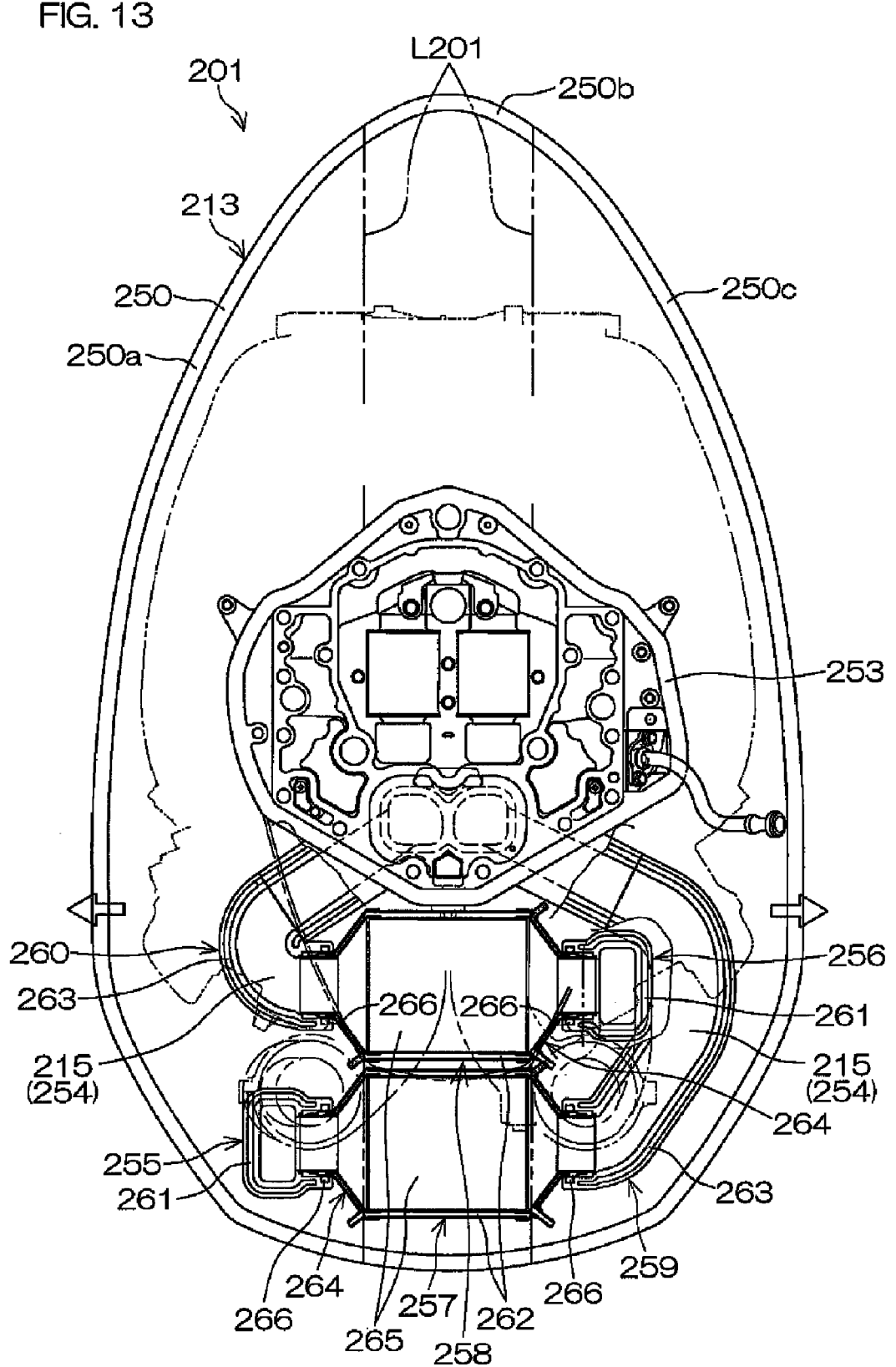
FIG. 13 is a partial sectional view of the outboard motor according to the reference embodiment of the present invention.

FIG. 11 is a side view of a portion of an outboard motor 201 according to a reference embodiment of the present invention. FIG. 12 is a partial sectional view of an engine 208 and an arrangement related thereto included in the outboard motor 201 according to the reference embodiment of the present invention. FIG. 13 is a partial sectional view of the outboard motor 201 according to the reference embodiment of the present invention. In FIGS. 12 and 13, hatching that indicates a section is omitted.

As shown in FIG. 11, the outboard motor 201 includes an engine 208 and an engine cover 213. As shown in FIG. 12, the engine 208 is housed inside the engine cover 213. The engine 208 preferably is, for example, a V-type multi-cylinder 4-cycle engine that includes the first cylinder column 16 and the second cylinder column 17. The engine 208 includes the plurality of cylinders 18 (for example, eight cylinders 18). The first cylinder column 16 and the second cylinder column 17 are respectively made up of the plurality of cylinders 18 that are aligned linearly along the vertical direction.

As shown in FIG. 11, the engine cover 213 includes a top cover 249 and a bottom cover 250. The top cover 249 is detachably coupled to the bottom cover 250. As shown in FIG. 13, the bottom cover 250 is divided, for example, into three along two dividing lines L201 that extend to the front and rear. The bottom cover 250 includes a plurality of divided members 250a, 250b, and 250c. The divided member 250b is disposed between the divided member 250a and the divided member 250c. The divided member 250a and the divided member 250c are arranged right/left symmetrically. The divided member 250a and the divided member 250c are detachably coupled to the divided member 250b.

As shown in FIG. 12, the engine 208 includes the crankcase 23, the cylinder block 24, and the two cylinder heads 25. The cylinder block 24 preferably has a V-shaped arrangement that spreads rearward in plan view. The two cylinder heads 25 are respectively coupled to the two rear end portions of the cylinder block 24. Each cylinder head 25 includes the plurality of combustion chambers 26, the plurality of intake ports 27, and the plurality of exhaust ports 28. Each intake port 27 is opened and closed by a corresponding intake valve 251, and each exhaust port 28 is opened and closed by a corresponding exhaust valve 252.

As shown in FIG. 11, the outboard motor 201 includes an exhaust guide 253 and an exhaust passage 215. The engine 208 is coupled to the exhaust guide 253 in a state of being set on the exhaust guide 253. The exhaust guide 253 defines a portion of the exhaust passage 15. The exhaust generated by the engine 208 is discharged underwater through the exhaust passage 15.

As shown in FIG. 11, the exhaust passage 15 includes two bypass passages 254. Each bypass passage 254 is a passage that bypasses an interior of the engine 208 and connects the cylinder head 25 and the exhaust guide 253. The exhaust generated by the engine 208 passes through one of the bypass passages 254 and an interior of the exhaust guide 253 (portion of the exhaust passage 15) and is discharged from the exit of the exhaust passage 15.

As shown in FIG. 11, the outboard motor 201 includes a first manifold 255, a second manifold 256, a first catalyst unit 257, a second catalyst unit 258, a first exhaust pipe 259, and a second exhaust pipe 260. The first manifold 255 is connected to the exhaust ports 28 of the four first cylinders 18a. The second manifold 256 is connected to the exhaust ports 28 of the four second cylinders 18b.

As shown in FIG. 13, the first catalyst unit 257 and the second catalyst unit 258 are connected to the exits of the first manifold 255 and the second manifold, respectively. The entrances of the first exhaust pipe 259 and the second exhaust pipe 260 are connected to the first catalyst unit 257 and the second catalyst unit 258, respectively. The exits of the first exhaust pipe 259 and the second exhaust pipe 260 are connected to the exhaust guide 253. The first manifold 255, the first catalyst unit 257, and the first exhaust pipe 259 define one of the bypass passages 254. The second manifold 256, the second catalyst unit 258, and the second exhaust pipe 260 define the other bypass passage 254.

As shown in FIG. 11, the first manifold 255 and the second manifold 256 are disposed at the rear of the engine 208. The first manifold 255 and the second manifold 256 are respectively disposed along the vertical direction. The first manifold 255 and the second manifold 256 are arranged right/left symmetrically. Each of the first manifold 255 and the second manifold 256 includes a water jacket 261 (see FIG. 13).

As shown in FIG. 11, the first catalyst unit 257 and the second catalyst unit 258 preferably are respectively, for example, cylindrical. The first catalyst unit 257 and the second catalyst unit 258 are respectively disposed horizontally in the right/left direction. The first catalyst unit 257 and the second catalyst unit 258 are disposed in parallel across an interval in the front/rear direction. Each of first catalyst unit 257 and the second catalyst unit 258 includes a water jacket 262 (see FIG. 13).

As shown in FIG. 13, each of the first exhaust pipe 259 and the second exhaust pipe 260 is arranged to extend in a curved manner along a horizontal plane. Each of the first exhaust pipe 259 and the second exhaust pipe 260 includes a water jacket 263 (see FIG. 13). Each bypass passage 254 is thus surrounded by the water jackets 261 to 263.

As shown in FIG. 13, each of the first catalyst unit 257 and the second catalyst unit 258 includes a cylindrical case 264 and a catalyst 265 housed inside the case 264. Each catalyst 265 is, for example, a ternary catalyst. Each catalyst 265 is, for example, cylindrical. Each catalyst 265 is held in a coaxial manner by the case 264. Respective end portions of each case 264 are detachably coupled respectively to the exit of the corresponding manifold 255 or 256 and the entrance of the corresponding exhaust pipe 259 or 260. The respective end portions of each case 264 are, for example, clearance fitted with respect to the corresponding manifold 255 or 256 and the corresponding exhaust pipe 259 or 260. Intervals between the respective end portions of each case 264 and the corresponding manifold 255 or 256 and the corresponding exhaust pipe 259 or 260 are sealed by O-rings 266. Each case 264 is exposed by the coupling of the plurality of the divided members 250a, 250b, and 250c being disengaged and the bottom cover 250 being disassembled. Exchange and maintenance of the first catalyst unit 257 and the second catalyst unit 258 are performed, for example, in a state where the bottom cover 250 is disassembled.

Other Preferred Embodiments

Although the preferred embodiments of the present invention have been described above, the present invention is not restricted to the contents of the above-described preferred embodiments and reference embodiment and various modifications are possible within the scope of the claims. For example, with the preferred embodiments and the reference embodiment described above, cases where the engines 8 and 208 are preferably V-type engines were described. However, the engine type is not restricted to the V-type and may be another type.

Figure 14:
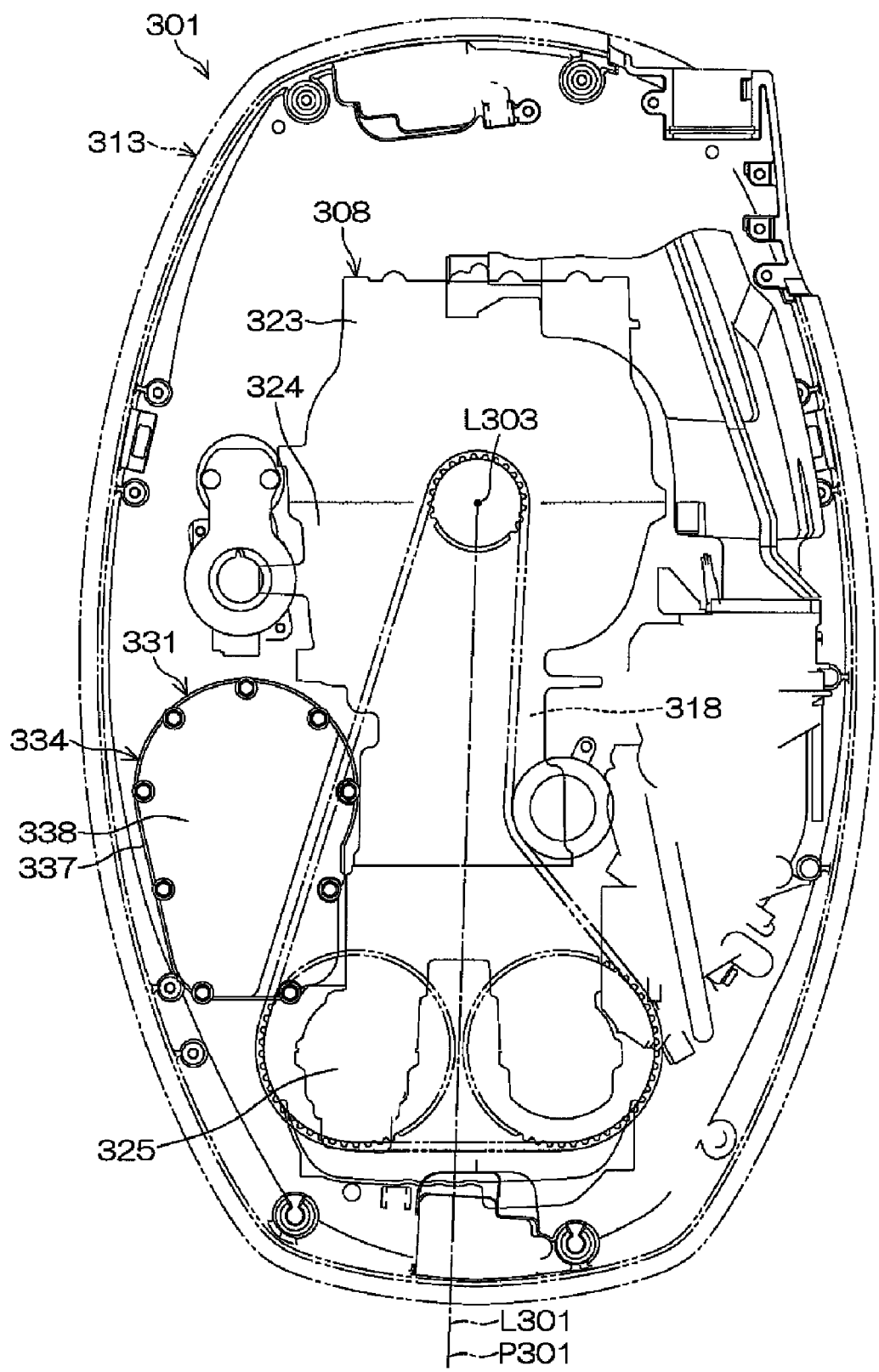
FIG. 14 is a plan view of an engine and an arrangement related thereto included in an outboard motor according to a third preferred embodiment of the present invention.
Figure 15:
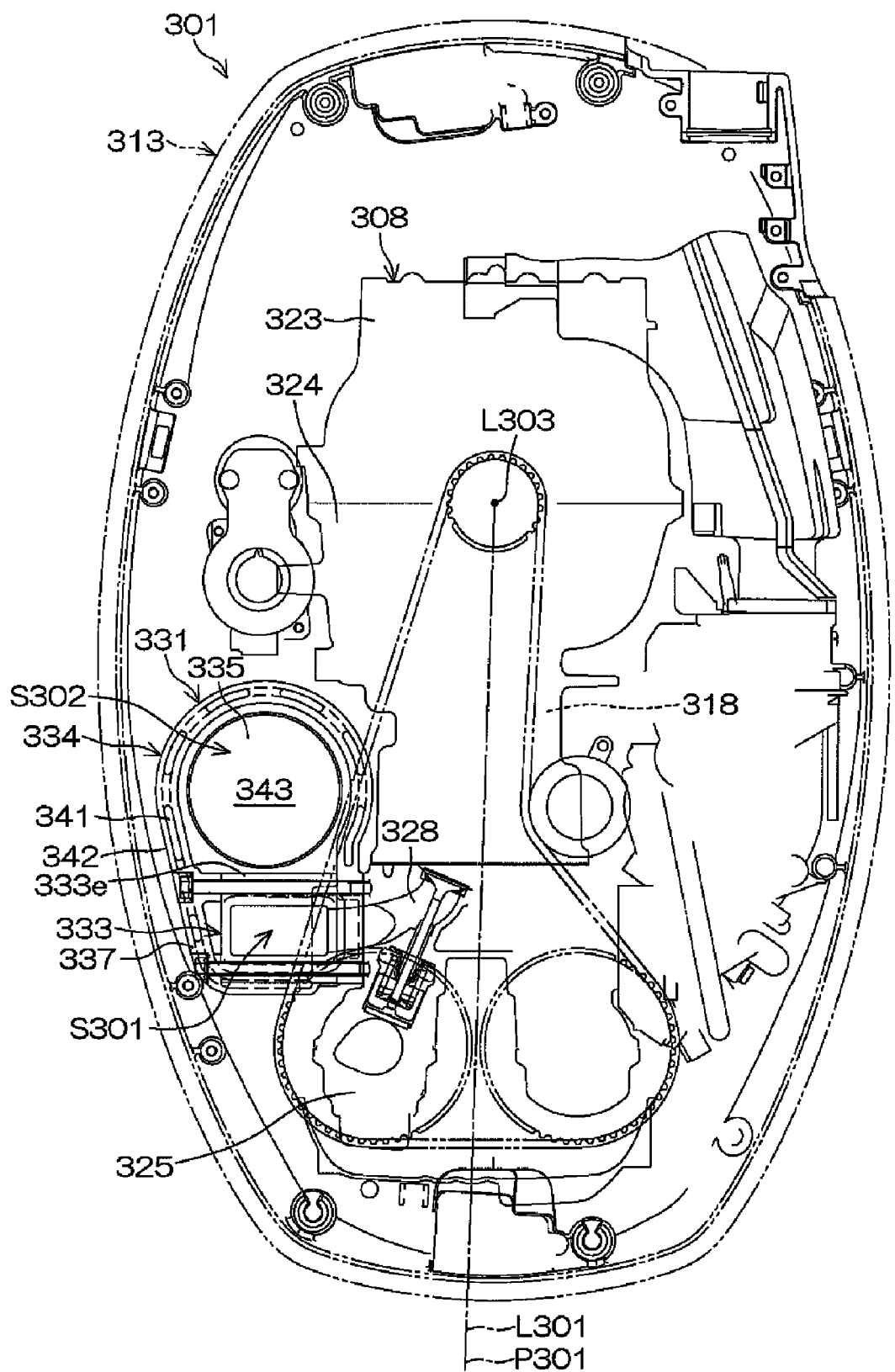
FIG. 15 is a partial sectional view of the engine and the arrangement related thereto included in the outboard motor according to the third preferred embodiment of the present invention.

Specifically, for example, an engine 308 included in an outboard motor 301 according to a third preferred embodiment of the present invention may be a straight engine as shown in FIG. 14 and FIG. 15. The engine 308 includes a crankcase 323, a cylinder block 324, and a cylinder head 325 that are disposed along the front/rear direction in plan view. Also, the engine 308 includes a plurality of cylinders 318 aligned linearly along the vertical direction. An exhaust unit 331 is disposed to a side of the cylinder block 324 and the cylinder head 325 inside an engine cover 313. The exhaust unit 331 is coupled to a side portion of the cylinder head 325.

The exhaust unit 331 includes a housing 334, which in turn includes an outer wall 342 provided with a water jacket 341, and a catalyst 335 disposed in an exhaust passage 343 defined by the outer wall 342. Also, the housing 334 includes a manifold 333 connected to exhaust ports 328 of the respective cylinders 318, a cylindrical main body 337 that extends vertically, and a lid 338 (see FIG. 14) made to cover an upper end of the main body 337. The manifold 333 and the catalyst 335 are housed inside the main body 337 and the lid 338. An interior of the main body 337 is partitioned by a portion (shared portion 333e) of the manifold 333 into a first exhaust space S301 and a second exhaust space S302. The first exhaust space S301 and a second exhaust space S302 are disposed at the same side with respect to a plane P301 that includes central axes L301 of the respective cylinders 318. In the third preferred embodiment, the plane P301 includes a crankshaft axis L303. The plane P301 may include the crankshaft axis L301 or not include the crankshaft axis L303.

Figure 16:
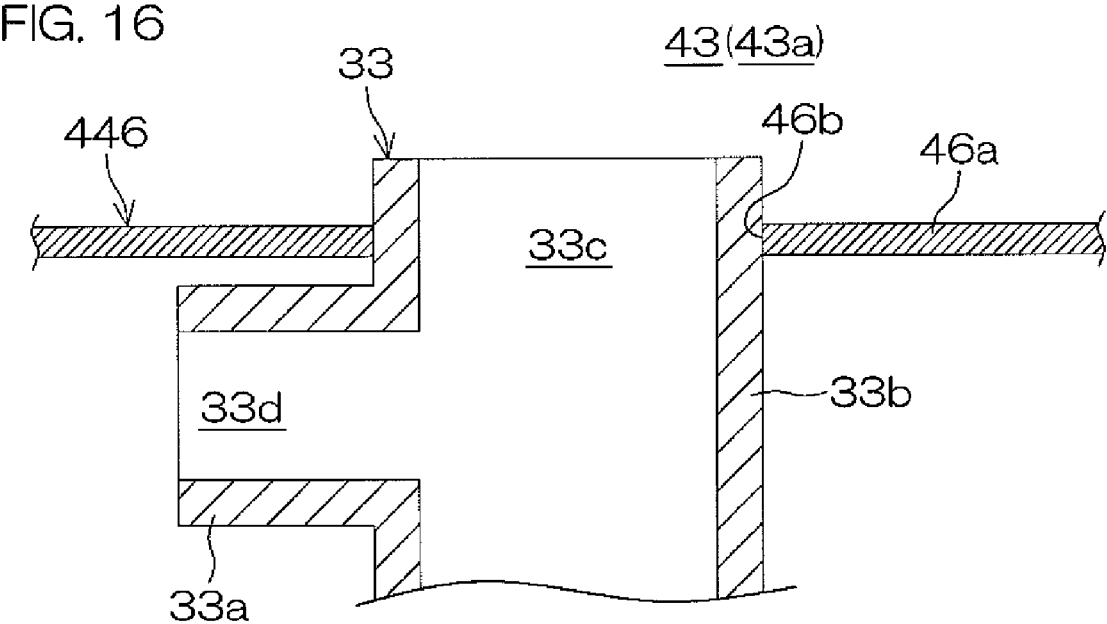
FIG. 16 is a schematic view of a modification example of the outboard motor according to the first preferred embodiment of the present invention.

Also, with the preferred embodiments described above, cases where the upstream side flange 46 includes the tubular portion 46d that protrudes from the flat plate portion 46a were described. However, the upstream side flange 46 does not have to include the tubular portion 46d. In this case, the collecting portion 33b of the first manifold 33 may be fitted in the passage hole 46b of an upstream side flange 446 in a manner such that an upper end portion of the collecting portion 33b protrudes from the flat plate portion 46a as shown in FIG. 16. With the arrangement of the present preferred embodiment, the condensed water that flows along an upper surface of the flat plate portion 46a is blocked by the upper end portion of the collecting portion 33b and thereby prevented from entering into the passage hole 46b. Backflow of the condensed water accumulated or otherwise present inside the exhaust passage 43 is thus prevented and the condensed water is prevented from entering into the engine 8 via the first manifold 33. Misfiring of the engine 8 is thereby prevented.

Also, with the preferred embodiments described above, the case where the first manifold 33 preferably is made of a material of higher melting point than the first main body 37 and the first lid 38 was described. However, the first manifold 33 may be made of a material of lower melting point than the first main body 37 and the first lid 38 or a material of substantially the same melting point as the first main body 37 and the first lid 38. Specifically, for example, the first manifold 33, the first main body 37, and the first lid 38 may all be made of stainless steel, for example. The same applies to the second manifold, the second main body 39, and the second lid 40.

Also, with the preferred embodiments described above, the case where the first manifold 33 preferably does not have a water jacket was described. However, the first manifold 33 may have a water jacket, and the same applies to the second manifold.

Also, with the preferred embodiments described above, the case where the water jacket 41 is preferably provided at a portion of the first housing 34 was described. However, the water jacket 41 may be provided at an entirety of the first housing 34. The same applies to the second housing 36.

Also, with the preferred embodiments described above, the case where the first manifold 33 is housed inside the first main body 37 and the first lid 38 without contact with the hollow portion 42a (portion provided with the water jacket 41) of the first housing 34 was described. Also, the case where the first catalyst 35 is housed inside the first housing 34 without contact with the first housing 34 was described. However, the first manifold 33 may be housed inside the first main body 37 and the first lid 38 in a state of contacting the hollow portion 42a of the first housing 34. Likewise, the first catalyst 35 may be housed inside the first housing 34 in a state of contacting the first housing 34. The same applies to the second manifold and the second catalyst.

Also, with the preferred embodiments described above, the case where the first exhaust unit 31 and the second exhaust unit 32 are disposed at the inner side of the V-shaped lines L2 defined by the central axes L1 of the plurality of cylinders 18 was described. However, the first exhaust unit 31 and the second exhaust unit 32 may be disposed at the outer side of the V-shaped lines L2.

Also, with the preferred embodiments described above, the case where the first manifold 33, the first main body 37, and the first lid 38 are separate members was described. However, the first manifold 33, the first main body 37, and the first lid 38 may be a single member. The same applies to the second manifold, the second main body 39, and the second lid 40.

A non-limiting example of [0001] the correspondence between the components mentioned in the "SUMMARY OF THE INVENTION" and the components of the above-described preferred embodiment are as follows.
cylinder . . . cylinder 18, 318
exhaust port . . . exhaust port 28, 328
engine . . . engine 8, 308
housing . . . first housing 34, second housing 36, housing 334
catalyst . . . first catalyst 35, second catalyst 81, catalyst 335
engine cover . . . engine cover 13, 313
first exhaust space . . . first exhaust space S1, S301
second exhaust space . . . second exhaust space S2, S302
partitioning wall . . . partitioning wall 33e, 333e
central axis . . . central axis L1, L301
plane . . . plane P1, P2, P301
outboard motor . . . outboard motor 1, 301, 401
first outer wall . . . first manifold 33, second manifold 78, manifold 333
second outer wall . . . first main body 37, first lid 38, second main body 39, second lid 40, main body 337, lid 338
water jacket . . . water jacket 41, 341
cooling portion . . . hollow portion 42a
first cylinder . . . first cylinder 18a
second cylinder . . . second cylinder 18b
V-shaped line . . . V-shaped line L2
exhaust exit . . . exhaust exit 33c
backflow preventing member . . . upstream side flange 46
passage hole . . . passage hole 46b
flat plate portion . . . flat plate portion 46a
tubular portion . . . tubular portion 46d
first manifold . . . first manifold 33, 533
second manifold . . . second manifold 78, second manifold 578
first catalyst . . . first catalyst 35
first exhaust pipe . . . first exhaust portion 67, first exhaust pipe 567
second catalyst . . . second catalyst 81, second catalyst 581
second exhaust pipe . . . second exhaust portion 79, second exhaust pipe 579
first communicating pipe . . . first communicating pipe 68, first communicating pipe 568
second communicating pipe . . . second communicating pipe 80, second communicating pipe 580

The present application corresponds to Japanese Patent Application No. 2010-055524 filed in the Japan Patent Office on Mar. 12, 2010, and the entire disclosure of this application is incorporated herein by reference.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. An outboard motor comprising:
an engine including a plurality of cylinders that are aligned vertically, and a plurality of exhaust ports to which exhaust is guided from the plurality of cylinders;

a housing including an interior arranged such that exhaust guided from the plurality of exhaust ports is guided to the interior of the housing, and a partitioning wall arranged to partition the interior of the housing into a first exhaust space connected to the plurality of exhaust ports and a second exhaust space connected to the first exhaust space, the housing arranged such that the first exhaust space collects and guides the exhaust guided from the plurality of exhaust ports and that the second exhaust space is disposed at a same side as the first exhaust space with respect to a plane that includes central axes of the plurality of cylinders;

a catalyst provided in the housing, the catalyst positioned at a height such that at least a portion of the catalyst overlaps with the first exhaust space when viewed from a horizontal direction, the catalyst disposed in the second exhaust space so as to guide exhaust guided from the first exhaust space to the second exhaust space; and an engine cover housing the engine and the housing.

2. The outboard motor according to claim 1, wherein the housing includes a first outer wall arranged to define the first exhaust space, the first outer wall including the partitioning wall, and a second outer wall to which at least a portion of the first outer wall is joined; and the first outer wall is made of a material that has a higher melting point than the second outer wall.

3. The outboard motor according to claim 1, wherein the housing includes a cooling portion disposed at least at a periphery of the second exhaust space, the cooling portion including a water jacket.

4. The outboard motor according to claim 3, wherein the partitioning wall is arranged to not contact the cooling portion.

5. The outboard motor according to claim 1, wherein the housing is arranged such that a cooling water is not supplied to the partitioning wall.

6. The outboard motor according to claim 1, wherein the plurality of cylinders include a plurality of first cylinders that are aligned vertically and a plurality of second cylinders that are aligned vertically;

the plurality of first cylinders and the plurality of second cylinders are arranged in a V-shaped configuration; and the housing is disposed at an inner side of V-shaped lines defined by central axes of the plurality of first cylinders and central axes of the plurality of second cylinders.

7. The outboard motor according to claim 1, wherein the first exhaust space includes an upwardly directed exhaust exit;

the outboard motor further comprises a backflow preventing member; and the backflow preventing member includes a flat plate portion provided with a passage hole in communication with the exhaust exit, and a tubular portion disposed along an edge portion of the passage hole and protruding from the flat plate portion to an opposite side from the exhaust exit.

8. An outboard motor comprising:

an engine including a plurality of first cylinders that are aligned vertically, a plurality of second cylinders that are aligned vertically, and a plurality of exhaust ports to which exhaust from the plurality of first cylinders and the plurality of second cylinders is guided, the engine arranged such that the plurality of first cylinders and the plurality of second cylinders are arranged in a V-shaped configuration;

a first manifold disposed at an inner side of V-shaped lines defined by central axes of the plurality of first cylinders and central axes of the plurality of second cylinders, the first manifold arranged to collect and guide exhaust guided from the plurality of first cylinders via the plurality of exhaust ports;

a second manifold disposed at the inner side of the V-shaped lines defined by the central axes of the plurality of first cylinders and the central axes of the plurality of second cylinders, the second manifold arranged to collect and guide exhaust guided from the plurality of second cylinders via the plurality of exhaust ports;

a first exhaust pipe in which a first catalyst is disposed, the first exhaust pipe arranged to guide exhaust guided from the first manifold;

a second exhaust pipe in which a second catalyst is disposed, the second exhaust pipe arranged to guide exhaust guided from the second manifold;

a first communicating pipe arranged to connect a lower end of the first manifold with a portion of the first exhaust pipe positioned downstream of the first catalyst; and a second communicating pipe arranged to connect a lower end of the second manifold with a portion of the second exhaust pipe positioned downstream of the second catalyst.

9. The outboard motor according to claim 8, wherein the first manifold is arranged such that the exhaust, guided from the plurality of first cylinders, is collected and guided vertically from below to above;

the second manifold is arranged such that the exhaust, guided from the plurality of second cylinders, is collected and guided vertically from below to above;

the first exhaust pipe is arranged to vertically guide the exhaust, guided from the first manifold, from above to below; and the second exhaust pipe is arranged to vertically guide the exhaust, guided from the second manifold, from above to below.

10. An outboard motor comprising:

an engine including a plurality of cylinders that are aligned vertically, and a plurality of exhaust ports to which exhaust is guided from the plurality of cylinders;

a housing including an interior arranged such that exhaust guided from the plurality of exhaust ports is guided to the interior of the housing, and a partitioning wall arranged to partition the interior of the housing into a first exhaust space connected to the plurality of exhaust ports and a second exhaust space connected to the first exhaust space, the housing arranged such that the first exhaust space collects and guides the exhaust guided from the plurality of exhaust ports upward, the second exhaust space guides the exhaust downward, and the second exhaust space is disposed at a same side as the first exhaust space with respect to a plane that includes central axes of the plurality of cylinders;

a catalyst provided in the housing, the catalyst positioned at a height such that at least a portion of the catalyst overlaps with the first exhaust space when viewed from a horizontal direction, the catalyst disposed in the second exhaust space so as to guide exhaust guided from the first exhaust space to the second exhaust space; and an engine cover housing the engine and the housing.

11. An outboard motor comprising:

an engine including a plurality of cylinders that are aligned vertically, and a plurality of exhaust ports to which exhaust is guided from the plurality of cylinders;

a housing including an interior arranged such that exhaust guided from the plurality of exhaust ports is guided to the interior of the housing, and a partitioning wall arranged to partition the interior of the housing into a first exhaust space connected to the plurality of exhaust ports and a second exhaust space connected to the first exhaust space, the housing arranged such that the first exhaust space collects and guides the exhaust guided from the plurality of exhaust ports and that the second exhaust space is disposed at a same side as the first exhaust space with respect to a plane that includes central axes of the plurality of cylinders;

a catalyst provided in the housing, the catalyst positioned at a height such that at least a portion of the catalyst overlaps with the first exhaust space and at least one of the plurality of cylinders when viewed from a horizontal direction, the catalyst disposed in the second exhaust space so as to guide exhaust guided from the first exhaust space to the second exhaust space; and an engine cover housing the engine and the housing.

12. An outboard motor comprising:

an engine including a plurality of cylinders that are aligned vertically, and a plurality of exhaust ports to which exhaust is guided from the plurality of cylinders;

a housing including an interior arranged such that exhaust guided from the plurality of exhaust ports is guided to the interior of the housing, and a partitioning wall arranged to partition the interior of the housing into a first exhaust space including a plurality of branch portions directly connected to the plurality of exhaust ports and a second exhaust space connected to the first exhaust space, the housing arranged such that the first exhaust space collects and guides the exhaust guided from the plurality of exhaust ports and that the second exhaust space is disposed at a same side as the first exhaust space with respect to a plane that includes central axes of the plurality of cylinders;

a catalyst provided in the housing, the catalyst positioned at a height such that at least a portion of the catalyst overlaps with the first exhaust space when viewed from a horizontal direction, the catalyst disposed in the second exhaust space so as to guide exhaust guided from the first exhaust space to the second exhaust space; and an engine cover housing the engine and the housing.

* * * * *